(12) United States Patent
Yasuda

(10) Patent No.: US 6,490,494 B1
(45) Date of Patent: Dec. 3, 2002

(54) METHOD AND APPARATUS FOR PROCESSING ORDER CONTROL

(75) Inventor: Tsuneo Yasuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 228 days.

(21) Appl. No.: 09/614,213

(22) Filed: Jul. 11, 2000

(30) Foreign Application Priority Data

Feb. 18, 2000 (JP) ........................................ 2000-042082

(51) Int. Cl.7 .............................................. G06F 19/00
(52) U.S. Cl. ........................ 700/101; 700/100; 700/102
(58) Field of Search .......................... 700/99, 100, 101, 700/102, 108, 111, 121

(56) References Cited

U.S. PATENT DOCUMENTS

| | | | | |
|---|---|---|---|---|
| 5,737,228 A | * | 4/1998 | Ishizuka et al. | 700/102 |
| 5,841,677 A | * | 11/1998 | Yang et al. | 700/100 |
| 6,122,621 A | * | 9/2000 | Shimada | 700/101 |
| 6,353,769 B1 | * | 3/2002 | Lin | 700/101 |

FOREIGN PATENT DOCUMENTS

| | | |
|---|---|---|
| JP | 3-290703 | 12/1991 |
| JP | 03290703 | 12/1991 |

* cited by examiner

Primary Examiner—Leo Picard
Assistant Examiner—Ryan Jarrett
(74) Attorney, Agent, or Firm—McDermott, Will & Emery

(57) ABSTRACT

A method and apparatus for processing order control, in which a load of an examination work to review a processing order of lots is reduced and all the lot flows are conditioned so as to move at an almost constant speed with the result that not only can accuracy in scheduling of delivery and so on be improved but degradation of the lot flows is also prevented from occurring in advance. A proper number R of in-process lots and others are obtained and lots are stacked before each of apparatuses so as to be equal in number to the proper number R of in-process lots, thereby a target of the number Cg of processing processes can be achieved. Since proper numbers of in-process lots in cases where a method in which a plurality of lots are simultaneously processed is employed and where a substitute processing method is employed can be obtained, some of the lots can be transferred to other fabrication apparatuses if the number of lots accumulated before an fabrication apparatus exceeds the proper number R of in-process lots. Furthermore, a previous process of a fabrication apparatus can process lots confirming a signal color at the next process thereof since signals each displaying a color corresponding to in-process levels of lots residing in the lot buffer can be provided to the respective fabrication apparatuses.

19 Claims, 24 Drawing Sheets

Fig. 3

| | |
|---|---|
| the number for the in-process lot | 200 |
| . . . | |
| lot A | |
| . . . | |
| the number of in-process lots | |
| 1 3 | |
| average processing time | |
| 0. 7 5 hours | 210 |
| proper number of in-process lot | |
| 3 | 212 |
| proper number of adjustment in-process lot | |
| — | 214 |
| the number of actually input lots | |
| 5 7 6 | 216 |
| signal color | |
| red | 218 |
| . . . | |

Fig. 9

| signal color | priority order for lot processing | state of the apparatus | lot buffer |
|---|---|---|---|
| red | 4 (minimum) | STOP | — (unrelated) |
| red | 4 | GO | above FULL |
| yellow | 3 | GO | NORMAL<-> FULL |
| blue | 2 | GO | NORMAL<-> EMPTY |
| orange (EMPTY) | 1 (maximum) | GO | below EMPTY |

| 143 earier process | L716, L717, L718, L719, L720 |
| 142 earier process | L711, L712, L713, L714, L715 |
| ------- | |
| 1 earier process | L6 , L7 , L8 , L9 , L10 |
| in-process | L1 , L2 , L3 , L4 , L5 |
| (Ln = lot to be processed at the nth place) | |

Fig. 13

```
30 days * 24 hours/

(Wtave+TPave)processes earlier   ··· Ln-2, Ln-1, Ln

·······

2 processes earlier 1 process earlier in-process stage                    L1, L2, ··· L(R+1)
```

Fig. 14

| lot input amount to the apparatus (1 month) | method of illuminating signal color |
|---|---|
| $Rinr > Ko \times Rin$ (input amount large) | the same color as before |
| $Rinr < Ko \times Rin$ (input amount small) | orange is forcibly changed to blue |

| lot number | after 1 process | after 2 processes | after 3 processes | after 4 processes | after 5 processes | signal scors |
|---|---|---|---|---|---|---|
| lot A (in-process) | blue | blue | red | yellow | orange | 38 |
| lot B (in-process) | red | blue | blue | blue | blue | 40 |
| lot C (in-process) | blue | blue | — | — | — | 18 |
| lot D (1 process earlier) | blue | blue | red | yellow | orange | 60 |

Fig. 17

[sorting method in a normal state]
 1) in-process position(in-process= 1 st, 01process earlier =2nd)
 2) priority order (ascending)
 3) signal score (ascending)
 4) the number of wafers (ascending)
 5) in-process date and timre (ascending)
 6) recipe (ascending, adopted mainly for collection of the same kinds of recipe)

Fig. 18

400

| lot number, in-process position, priority, signal score, the number of wafers, in-process date and time, recipe, ··· |
|---|
| lotH , in-process , 0 2, 3 0     , 1 2    , 9/13 19:57:44, 0 1   , ··· |
| lotG , in-process , 0 2, 3 4    , 2 4    , 9/14 13:17:32, 3 5   , ··· |
| lotK , in-process , 0 3, 3 0    , 0 1    , 9/14 11:52:12, 3 3   , ··· |
| lotX , in-process , 0 3, 3 0    , 1 1    , 9/11 22:21:58, 0 1   , ··· |
| lotC , 0 1 earlier , 0 1, 6 1    , 2 1    , —              , 3 1   , ··· |
| ··· |

Fig. 19

[sorting method in a normal state]
  1) in-process position(in-process= 1 st, 01process earlier=2nd)
  2) recipe(ascending, adopted mainly for collection of the same kinds of recipe)
  3) the number of wafers(ascending)
  4) signal score(ascending)
  5) priority order(ascending)
  6) in-process date and timre(ascending)

| lot number, in-process position, recipe, the number of wafers, signal score, priority, in-process date and time, ⋯ |
|---|
| lotP , in-process , As100 , 1 2 , 3 0 , 0 3, 9/10 08:35:36, ⋯ |
| lotS , in-process , B035 , 2 4 , 4 0 , 0 3, 9/14 08:19:13, ⋯ |
| lotD , in-process , B100 , 1 2 , 3 0 , 0 3, 9/14 10:12:02, ⋯ |
| lotT , in-process , B200 , 2 4 , 4 3 , 0 3, 9/14 06:52:58, ⋯ |
| lotQ , 02 earlier , As010 , 1 2 , 6 1 , 0 3, − , ⋯ |
| ⋯ |

Fig. 26

| No | lot flow system | On-road traffic control system |
|---|---|---|
| 1 | one lot processing | A road with one traffic lane (a low speed lane or a parking lane in addition to a main lane) |
| 2 | simultaneous processing of a plurality of lots | A road with more than two traffic lanes (a low speed lane or a parking lane in addition to a main lane) |
| 3 | substitution processing | A plurarity of road originating from an intetersection or branched roads (a low speed lane or a parking lane in addition to a main lane) |
| 4 | target C g | Statutory speed |
| 5 | proper number of in-process | A proper number of vehicles on the road = Road length / (average body length + braking distance) |
| 6 | procress flow | A course from starting point to destination |
| 7 | processing order = sequentialorder from the top of the set-up information | Passage order = similtaneous passings from the top of the set-up information. But, in the passing of the adjacent vehicles each other, priority is given to the top and double passing is not allowed. |

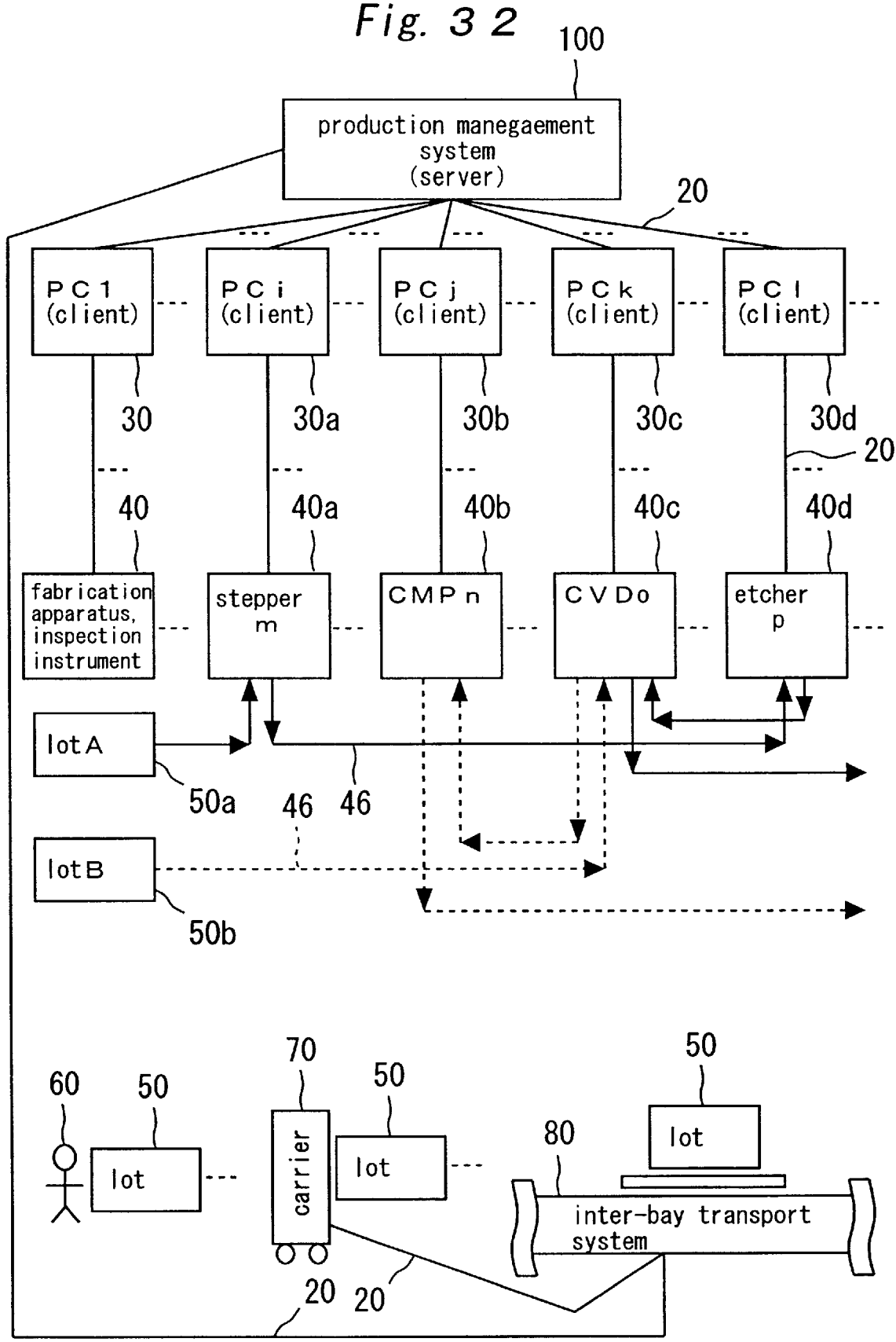

US 6,490,494 B1

METHOD AND APPARATUS FOR PROCESSING ORDER CONTROL

BACKGROUND OF THE INVENTION

1. Field of the Invention

The present invention relates a method and apparatus for processing order control, and particularly to a method and apparatus by which optimization is achieved of a physical flow of lots each configured by a group of wafers in a semiconductor fabrication line.

2. Description of Related Art

First, descriptions will be given of constituents associated with a physical flow of lots (hereinafter referred to as a lot flow) and of workings of the constituents using FIG. 32, which is a schematic illustration of a semiconductor fabrication line. Following this, descriptions will be given of constituents of a production control system, which is an apparatus to control a lot flow, and of workings of the constituents using FIGS. 33 and 34. Finally, description will be given of a flow chart of a control method for a lot flow using FIG. 35.

FIG. 32 shows a schematic illustration of a semiconductor fabrication line. In FIG. 32, a symbol 100 denotes a server computer of a production control system (hereinafter referred to as a server). The server means to receive a request and an instruction from a client computer (hereinafter referred to as a client) and basically to transmit neither a request nor an instruction to a client. A symbol 20 denotes communication cables connecting between the constituents, and symbols 30a to 30e client computers (hereinafter referred to as PCs; a digit or a letter 1, i, l, k and l following the abbreviation PC denote serial numbers). Symbols 40, 40a to 40d denote fabrication apparatuses for a semiconductor device, an inspection instrument or the like. For example, Stepper, CMP (Chemical Mechanical Polishing), CVD (Chemical Vapor Deposition) or Etcher are names directly showing features of semiconductor fabrication methods, respectively, which are adopted as names of a fabrication apparatus or an inspection instrument each without any modification. While there are available various other fabrication apparatuses, typical kinds among them are selected herein. Stepper m means the mth one among a plurality of steppers. This also applies to cases of CPMn, CVD0 and Etcher p. Symbols 50, 50a and 50b denote a lot A or/and a lot B, respectively, each of which lots includes a plurality of silicon wafers that serve as substrates of semiconductor products. The lot A (50a) and lot B (50b) denote that those are lots to which respective different fabrication methods are applied. In a case where the lots are subjected to the same fabrication method, those are different in fabrication position in the fabrication line in which fabrication methods are applied. A symbol 46 denotes a transport route running along the fabrication methods; a symbol 60 an operator carrying out transportation of a lot 50 or the like in the semiconductor fabrication line; 70 a carrier for a lot 50, serving mainly for transportation over a short distance; and 80 an inter-bay transport system, serving mainly for transportation over a long distance. The term "bay" used here means a region where apparatuses 40a of the same kind form a group and for example, a bay is used in a way of expression such as a bay in which steppers reside.

Then, a flow of the lot A (50a) will be described. The operator 60 or the lot carrier 70 transports the lot A (50a) to Stepper m (40a) and sets the lot A (50a) at a processing position. After processing conditions are input to Stepper m (40a) and the processing is completed, the operator 60 or the lot carrier 70 transfers the lot A (50a) to the inter-bay transport system 80. The inter-bay transport system 80 transports the lot A (50a) to the bay of Etcher p (40d). The operator 60 or the lot carrier 70 receives the lot A (50a) from the inter-bay transport system 80 and transports the lot A (50a) to Etcher p (40d) to set the lot A (50a) at a processing position. Thereafter, description is omitted since that of Stepper m is duplicated. Such processings and transportations are repeated till completion of all the fabrication process of the lot A (50a). Description of a case of the lot B (50b) is also omitted since description is repeated in the same way except for a transport pattern.

FIG. 33 shows internal constitution of the production management system of production control system (server) 100, the client 30 and others of FIG. 32. In FIG. 33, a symbol 110 denotes a data base in the server 100 and the interior is configured in the following way: A symbol 120 or 130 stores process flow data of respective lots 50 therein. The term "process flow" means data in which fabrication orders and processing conditions are defined and which includes the entire information and a plurality of process step groups. The entire information includes information on all of the lots 50 such as lot numbers. Other information such as product kind codes and delivery times is further included in the entire information, but details of the other information are omitted. A given process has a serial number showing a place in the order of processes, the name of an apparatus 40 or the like in which a processing is carried out and progress states of a process showing processing-completed, in-process or not-processed, respectively, wherein the term "in-process" means a state in which a work awaits its turn. In addition, the process has processing conditions, specified date and time for start or end of the process and so on, but the details are omitted. There are a plurality of process flow files: for example, a process flow file 120 used for the lot A and a process flow file 130 used for the lot B.

Symbols 140 and 150 denote in-process work management files in which data for in-process management for apparatuses 40 and so on is stored and the data for the in-process work management files include a plurality of lot numbers in process of the apparatuses 40 and the numbers of the lots in process thereof. Since the apparatuses 40 are present in plural number, for example, the in-process management files 140 and 150 are used for Etchers p and CVDo, respectively.

Symbols 160 and 170 denote processing history files in which data of processing histories of the lots 50 in the respective apparatuses 40 is stored and a data of one record is input in the file each time a lot 50 is processed in one of the apparatuses 40. Items of a record include: specified dates and times (while there is also a specified date and time for start or end of a processing, only the date and time for end of a processing is shown for each lot in FIG. 32); lot numbers; times (durations from start to end of processing) and others. Although the items of a record further include processing conditions and information on a person in charge of processing and so on, details of the items are omitted. Since the apparatuses 40 or the like are present in plural number, for example, the processing history files 160 and 170 are used for Etcher p and CVDo, respectively.

A symbol 180 denotes a computation section performing input/output processings of data with the data base 110 or processing/computation of data in the server 100, a symbol 190 denotes a communication section, 30e1 a communication section in PC1 (30d), and 30e2 a computation section performing processing/computation of data in PC1 (30d).

The communication sections 190 and 30e2 both control transmission/reception of data between the computation sections 180 and 30e2. A symbol 30e3 is a display section in PC1 (30d) and displays a data processed/computed in the computation section 30e2. The data to be displayed includes set-up information for Etcher p in a file 30e31, a special command in a file 30e32 or the like, both to be described later. The set-up information of Etcher p 30e31 includes lot numbers, priority numbers each to determine the processing order, the number of wafers and so on. Although the set-up information further includes processing conditions, specified dates and times for in-process works and so on, details of the information are omitted. The special command file 30e32 includes names of the apparatuses 40 and ways of lot flow in which processing of the lot 50 or the like to reach the apparatuses 40 or the like is stopped and the lot 50 or the like is forced to wait its turn at the process where the processing is stopped, and in which the lot 50 or the like is ascended in the order of processing to reach its destination earlier. A symbol 30e4 denotes an input section incorporated in PC1 (30d) which controls inputting of a person in charge when a process gets started or an inspection result.

FIG. 34 describes workings of the production control system 100 shown in FIG. 33 using a flow chart, taking up a case where one process is progressed as an example. The term "is progressed" means to complete the processing. As shown in FIG. 34, a data of completion of processing in Etcher p (40d), for example, in the 96th process (123) of the lot A (50a) is first transmitted from the input section 30e4 of PC1 (30d) through the computation section 30e2 of PC1 (30d), communication section 30e1 of PC1 (30d) and the communication section 190 of the server 100 to the computation section 180 of the server 100 (step S100). The computation section 190 of the server 100 that has received the data accesses to the data base 110 and changes "in-process" of Etcher p (40d) into "processing-completed" thereof in the 96th process (123) of the process flow file 120 for the lot A (50a) (step S102). The computation section 180 of the server accesses to the data base 110 and deletes the lot A (142) from in-process lot numbers of the in-process management file 140 for Etcher p (40d). The counter 146 for the number of in-process lots is decreased by one from 13 to 12 (step S104). The computation section 180 of the server accesses to the data base 110 and extracts process information from the corresponding process flow file 120 with a lot number of the in-process management file 140 for Etcher p (40d) as key. The extracted data group constitutes the latest information in the set-up information file 30e31 for Etcher p (40d) (step S106). The computation section 30e2 of PC1 (30d) requests transmission of the latest data of set-up information in the set-up information file 30e31 from the computation section 180 of the server 100 (step S108). The computation section 30e2 of PC1 (30d) rearranges the set-up information in the set-up information file 30e31 for Etcher p (40d) which has received from the computation section 180 of the server so as to be in the ascending order of an in-process position>a priority order>an in-process data and time (step S110). The term "in-process position" means to determine such that a case where a lot is currently in process of one of the apparatuses 40 or the like is a lot '0 process earlier' and a case where a lot is in the previous first process of the one of the apparatuses 40 or the like is a lot '1 process earlier.' The term "ascending order" means to sort lots based on in-process positions so as to be in the order of '0 process earlier,' '1 process earlier' and '2 process earlier' starting with the '0 process earlier' with increase in in-process position. With the above procedure, the in-process position of lot A (50a) moves from Etcher p (40d) in the 96th process (123) to the CVDo in the 97th process (124). Then, a similar procedure is performed on the CVDo (40c) in program flow from step S112 to step S120.

The computation section 190 of the server 100 changes "not-processed" of the CVDo in the next process (124) of the process flow file 120 for the lot A (50a)to "in-process" thereof (step S112). The computation section 180 of the server accesses the data base 110 and adds the lot A (142) into in-process lot numbers in the in-process management file 150 for CVDo (40e). The counter 156 for the number of in-process lots is incremented by 1 from 3 to 4 (step S114). The computation section 180 of the server accesses the data base and extracts process information from the corresponding process flow file 130 with a lot number in the in-process management file 150 for CDVo as key. The extracted data group is the latest set-up information for CVDo (40e) (step S116). The computation section 30e2 of the PCk (30c) requests transmission of the latest data of set-up information for CVDo (40e) from the computation section 180 of the server 100 (step S118). The computation section of the PCk (30c) rearranges the set-up information file 30e31 for CVDo (40e) which has received from the computation section 180 of the server so as to be in the ascending order of an in-process position>a priority order>an in-process date and time (step S120).

Description will be made of an optimization method for a lot flow in in-process management of the lot 50 or the like as described above using FIG. 35. FIG. 35 shows a flow chart for a conventional lot flow control computation. As shown in FIG. 35, the flow chart is divided into three regions in a broad sense: a target determination region for a first one (step S200), a judgment region for a second one (steps S202, S204 and S206) and a lot flow instruction region for a third one (steps S208, S210, S212 and S214). First, as shown by a graph in the target determination region (step S200), a target value for the number of processing lots per day of the apparatus 50 or the like is obtained. To be more detailed, movement of the number of processing lots per each day through one month in the apparatus 50 or the like is recorded. For example, the movement of the number of processing lots per each day can be obtained by extracting data from the processing history file 160 for Etcher p (40d). The numbers of processed lots per day included in the upper 5 places are selected from the list obtained by sorting data of the movement of the numbers of processing lots per day in the ascending order of the number of processing lots, and the average of the 5 numbers is obtained and adopted as the target value, which is updated once per month.

The judgment region includes three judgment conditions (steps S202, S204 and S206). First, it is judged whether of not the number of processing lots on the previous day (track record) exceeds the target value (step S202). If the track record is judged to exceed the target value, program flow goes to step S204, while if judged not to exceed, program flow goes to step S206. At step S204, it is judged whether or not the number of in-process lots is less than the number m of lots in excessive supply, which is arbitrarily set. If the number of in-process lots is judged to be less than the number m of lots in excessive supply, program flow goes to step S208, while judged not to be less than the number m, program flow goes to step S210. On the other hand, at step S206, it is judged whether or not the number of in-process lots is less than the number n of lots in short supply, which is arbitrarily set. If the number of in-process lots is judged to be less than the number n of lots in short supply, program flow goes to step S212, while if judged not to be less the number n, program flow goes to step S214.

The lot flow instruction region includes four kinds of instructions (steps S208, S210, S212 and S214). At step S206, there is shown the order of lot processing in a case where there is no special problem in a lot flow. To be concrete, lots are sorted so as to be in the ascending order of an in-process position>a priority order>an in-process date and time and processing is performed from the lot 50 or the like in the top place in the order. What is to be considered in connection with the in-process date and time is that a method of first-in first-out (FIFO) is adopted. At step S210, a special instruction is issued to stop the lot 50 or the like which would otherwise flow into one of the apparatuses 40 in a later process since in-process lots are in excessive supply for the one of the apparatuses 40 in the later process. At step S212, the situation is reverse from step S210 and a special instruction is issued to force the lot 50 or the like to flow quickly since in-process lots are in short supply. At step S214, a special instruction is issued to investigate a cause for delay in lot processing and restore the current lot processing state to normal, since the lot processing has been delayed for the cause.

A conventional lot flow control method has had two problems since the method has a configuration as described above. The special instructions (at steps S210 and S212) are issued to all of PC30 and others and PC 30 and others reexamine the processing order of the lot 50 or the like according to the special instructions (at steps S210 and S212). The term "reexamine" means that after investigating the subsequent processes (for example, 5 processes) of the lot 50 and others, if there is an apparatus 40 or the like corresponding to any of the special instructions (at steps S210 and S212), a place of the lot 50 or the like in the processing order is changed. Since there were no clear rules in the reexamination procedure in the prior art and in addition, such a procedure was conducted by a human hand, there was a problem that the reexamination work was a considerably heavy load. Furthermore, in a case where the special instructions (at steps S210 and S212) are issued, a problem has still been left unsolved since there arises a state where a lot 50 or the like is quickly processed, but another lot 50 stops in sudden, and therefore, all of the lot flow gets into a situation like a behavior of an aircraft in an air turbulence, making a delivery schedule or the like very hard to plan and carry out.

As an example of a lot flow control, a method is available, in which, as disclosed in Japanese Patent Laid-Open No. Hei 3-290703, part of lots already in process on an apparatus is redistributed on another apparatus or over other apparatuses in proportion to processing capacities of apparatuses to improve an efficiency of the lot flow. The above described methods are effective to relieve an already degraded lot flow state like a traffic congestion where as a result of concentration of lots onto a specific apparatus, a long time is required for each lot to pass through the apparatus. However, a problem has still remained since the methods are not effective for a preliminarily preventive measure for degradation of lot flow.

SUMMARY OF THE INVENTION

It is accordingly an objective of the present invention, which has been made in order to solve the above described problems, is to provide a method and apparatus for processing order control by which a load of an examination work as shown in each of the instructions (at steps S210 and S212) is reduced in which the processing order of the lots 50 is reviewed based on processing capacities of the apparatuses 40 or the like and each of the numbers of in-process lots 50 or the like.

It is another objective of the present invention to provide a method and apparatus for processing order control by which all of the lot flow is rectified to a state in which lots do not move as if an aircraft is in an air turbulence but move at an almost constant rate like a steady flow to increase an accuracy in scheduling deliveries and so on.

It is still another objective of the present invention to provide a method and apparatus for processing order control by which degradation of a lot flow can be prevented in advance.

According to a first aspect of the present invention, there is provided a processing order control method for controlling an order in processing that processing objects receive from a processing apparatus, respectively, comprising the steps of a processing waiting time computing of obtaining a processing waiting time per process by dividing a total processing waiting time during which a processing object is placed in a processing waiting state where the processing object awaits processings given by the processing apparatuses in a predetermined time, by the number of processing processes that the processing object receives in the predetermined time; an average processing time computing of obtaining an average processing time per process per processing object for a processing apparatus by dividing a total processing time spent for processings that the processing objects receive from the processing apparatus, by the number of processing processes and by the number of processing objects; a number of waiting processing objects computing of obtaining a proper number of waiting processing objects that receive processings in a processing apparatus by dividing the processing waiting time per process obtained by the step of the processing waiting time computing, by the average processing time per process per processing object for the processing apparatus obtained by the step of the average processing time computing; and a control of conducting control to equalize an actual number of processing waiting objects that receive processings in a processing apparatus with a proper number of waiting processing objects obtained by the step of the number of waiting processing objects computing which processing objects receive processings in the processing apparatus.

According to a second aspect of the present invention, there is provided a processing order control apparatus having processing objects and a processing apparatus that process the processing objects, comprising: processing waiting time computing means for obtaining a processing waiting time per process by dividing a total processing waiting time during which a processing object is placed in a processing waiting state where the processing object awaits processings given by the processing apparatuses in a predetermined time, by the number of processing processes that the processing object receives in the predetermined time; average processing time computing means for obtaining an average processing time per process per processing object for a processing apparatus by dividing a total processing time spent for processings that the processing objects receive from the processing apparatus, by the number of processing processes and by the number of processing objects; the number of waiting processing objects computing means for obtaining a proper number of waiting processing objects that receive processings in a processing apparatus by dividing the processing waiting time per process obtained by the processing waiting time computing means, by the average processing time per process per processing object for the processing apparatus obtained by the average processing time computing means; and control means for conducting control to equalize an actual number of processing waiting objects that receive processings in a processing apparatus with a proper number of waiting processing objects obtained by the number of waiting processing objects computing means which processing objects receive processings in the processing apparatus.

The above and other objects, effects, features and advantages of the present invention will become more apparent from the following description of the embodiments thereof taken in conjunction with the accompanying drawings.

BRIEF DESCRIPTION OF THE DRAWINGS

FIG. 3 shows a data base (DB) construction for in-process management in the embodiment 1 of the present invention.

FIG. 9 shows color allotment for signal lights of a signal 29 in the embodiment 5 of the present invention.

FIG. 13 describes the third step in the embodiment 6 of the present invention.

FIG. 14 shows definitions for change in signal color depending on a lot input amount in the embodiment 6 of the present invention.

FIG. 17 shows a sorting method in a normal state where the number of in-process lots is not extremely large in an embodiment 8.

FIG. 18 shows one example of set-up information for Etcher p in a case where the sorting method shown in FIG. 17 is applied.

FIG. 19 describes a sorting method in an abnormal state in which the number of in-process lots is extremely large in an embodiment 9 of the present invention.

FIG. 20 is one example of set-up information for an ion implantation system in a case where the sorting method shown in FIG. 19 is used.

FIG. 26 shows similar items between a lot flow system and an on-road traffic control in the embodiment 11.

FIG. 32 shows a schematic illustration of a semiconductor fabrication line.

DETAILED DESCRIPTION OF THE PREFERRED EMBODIMENTS

Figure 1:
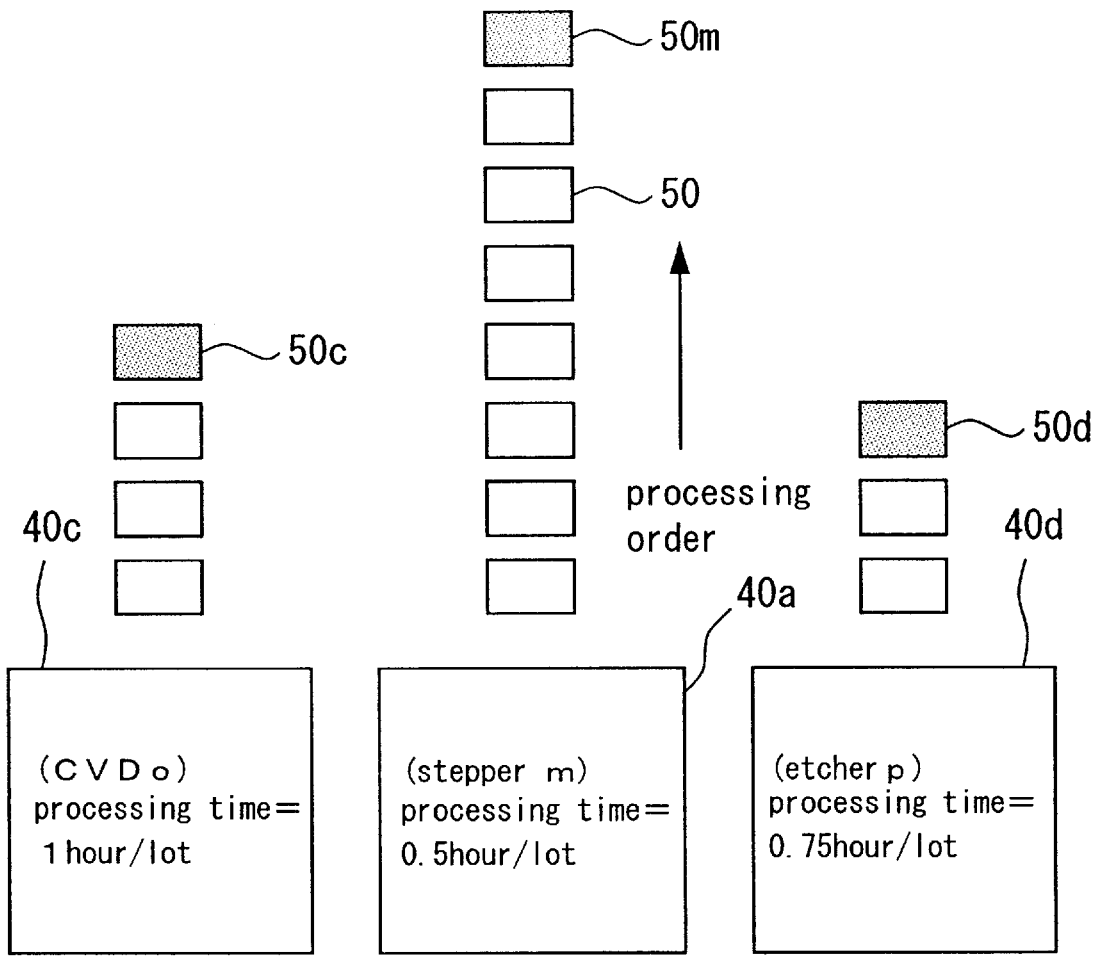
FIG. 1 describes a determining method for a target value of the number of processing lots in an embodiment 1 of the present invention.

Embodiments of the present invention will be described below with reference to the accompanying drawings. It is noted that the same reference symbols in the drawings denote the same or corresponding components.

Embodiment 1

FIG. 1 describes a determining method for a target value of the number of processing lots in an embodiment 1 of the present invention. In FIG. 1, a symbol 40*a* denotes Stepper m and an average processing time per lot thereof is set to 0.5 hour. A symbol 40*c* denotes CVDo and an average processing time per lot is set to 1 hour. A symbol 40*d* denote Etcher p and an average processing time per lot is set to 0.75 hour. A symbol 50 denote lots and the lots are stacked at each of apparatuses 40*a* or the like. The lots 50 are processed starting from the lowest lot 50 as shown by an arrow of the processing order. Groups of lots 50 stacked at the respective apparatuses 40*a* or the like show an optimal distribution of in-process lots over the apparatuses 40*a*. For example, when a target number of processing steps is set to 5 steps/(lot·day), a processing waiting time per lot is computed as about 4 hours. Therefore, a lot 50*c* stacked before CVDo 40*c* takes about 4 hours in passing through CVDo 40*c*. This applies to cases of lots 50*m* and 50*d* stacked before the other apparatuses.

Figure 2:
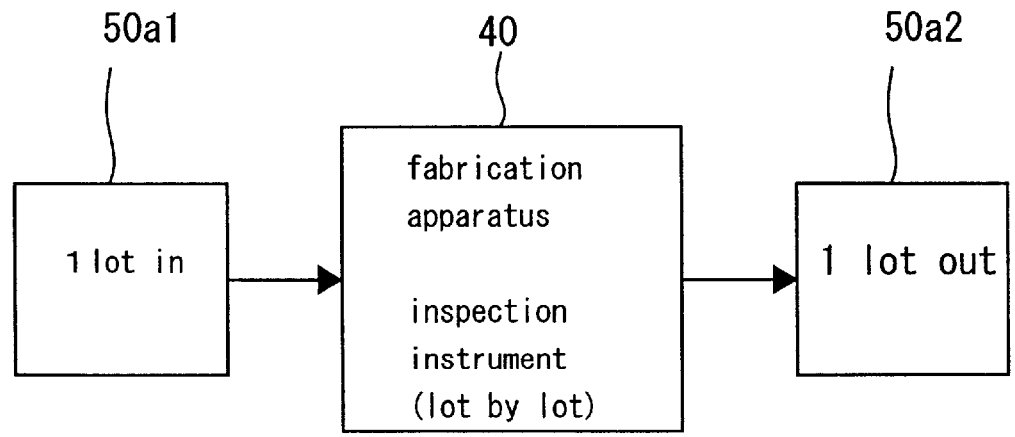
FIG. 2 describes 1 lot processing in the embodiment 1 of the present invention.

FIG. 2 describes 1 lot processing in the embodiment 1 of the present invention. The apparatus 40*a* and others are classified into four kinds according to processing methods and FIG. 2 is one of the four kinds thereof. In FIG. 2, a symbol 50a1 denotes a lot before processing (lot in), a symbol 50a2 a lot after processing (lot out) and a symbol 40 is a fabrication apparatus or an inspection instrument in which lot-by-lot processing is conducted. As shown in FIG. 2, the lots are processed one by one.

FIG. 3 shows a data base (DB) construction for in-process management in the embodiment 1 of the present invention. As shown in FIG. 3, a conventional in-process management file 140 or the like is different from that 200 of in-process management in the embodiment 1 of the present invention in that the following items are newly added to the prior art: fields of an average processing time per lot 210, a proper number (R) of in-process lots 212, a proper number of adjustment in-process lots 214, the number of actually input lots 216 and a signal color 218, which items will be detailed later.

Then, description will be made of a way to determine a target value of the number of processing lots in the embodiment 1 with reference to FIG. 1 or 3: If an average number of processing steps per day over all the lots 50 is denoted as variable Cg, a computation shown below is conducted so as to increase a processing capacity of a semiconductor fabrication line to its maximum when Cg is gradually increased to reach the maximum thereof. That is, Cg is a target value of the processing capacity of the semiconductor fabrication line. Cg is defined by the following Equation 1:

Average number of processing processes per day for all the lots 50=$Cg$[The number of processes/(Days·Lots)]   (Equation 1)

An average processing time through all the processes over one month is defined by a variable TPave. TPave used for a month in consideration is that of the previous month. Computation of an average processing time through all the processes TPave is conducted in a procedure in which processing histories (160 and 170) of all the apparatuses 40 or the like are taken as objects for retrieval and a time (a processing time) in a case where a data of time and day falls in the retrieval range of the entire previous month is extracted. An average of the times (processing times) extracted as described above is set to an average processing time through all the processes TPave. The average processing time through all the processes TPave is defined by the following Equation 2:

Average processing time through all the processes=$TPave$ [Time/The number of processes]=$\Sigma$Time (Processing time)/$\Sigma$The number of processes   (Equation 2)

An average allowable waiting time per process is defined by variable Wtave. Wtave is defined by the following Equation 3.

(Equation 3)
Average allowable waiting time per persons = Wtave [Time/The number of processes]
= All waiting time per day per lot/Average number of processing processes per day per lot
= (24 [Time/(Days · Lots)]- All processing time per day per lot)/Average number of processing processes per day per lot
= (24 [Time/(Days Lots)] - TPave × Cg)/Cg An average processing time per process of an apparatus in consideration is defined by a variable Peave and the variable Peave is obtained as shown below: A computation of the average processing time per process of the apparatus is obtained in a procedure in which processing histories (160 and 170) of the apparatus 40 or the like are taken as objects for retrieval and a time (a processing time) in a case where a data of time and day falls in the retrieval range of the latest 5 data (actually, the number of the latest data is arbitrarily set in the range of from about 5 to about 10 as standard). The average of times (processing times) extracted as described above is adopted as an average processing time per process Peave of the apparatus in consideration. The average processing time per process Peave of the apparatus in consideration is managed in a field 210 of a new in-process management file 200.

(Equation 4)
Average processing time per process of the apparatus in consideration
= Peave [Time/(The number of processes · Lots)]
= $\Sigma$ Time (Processing time)/$\Sigma$ The number of processes After the above described computation, a proper number (variable R) of in-process lots of the apparatus in consideration can be finally obtained using the following equation 5:

(Equation 5)
Proper number of in-process lots of the apparatus in consideration
= R [Lots]
= Average allowable waiting time per process/Average processing time of the apparatus
= Wtave/Peave Values of a proper number R of in-process lots are managed in the filed 212 of the new in-process management file 200 all times. When proper numbers R of in-process lots are obtained for all the apparatuses 40 or the like, a distribution of in-process lots is matched with proper numbers R of in-process lots by methods described in the following embodiments and all the apparatuses 40 or the like continue lot processings with no pause between lots, then the average number of processing processes per day Cg over all the lots 50, which is a target value, can be achieved. A proper number R of in-process lots of Stepper m (40a) is obtained by substituting particular figures in the above described formulae 1 to 5 as follows:

The target is determined with $Cg$=5 [The number of processes/(Days·Lots)]

Assuming that TPave is computed from a retrieval result through one month as follows:

TPave = 1 [Time/The number of processes]
Wtave = (24 [Time/(Days · Lots)] - TPave × cg)/Cg
= (24 [Time/(Days · Lots)] - 1 [Time/The number of processes] × 5 [The number of processes/(Days · Lots)])/5 [The number of processes/(Days · Lots)]
≈ 4 [Time/The number of processes]

If the following value is computed from the retrieval result on processing histories of the latest 5 data, Peave=0.5 [Time/(The number of processes·Lots)]

a computation can be carried out as follows:

$$R = Wtave/Peave$$
$$= 4 \text{ [Time/The number of processes]}/0.5 \text{ [Time/(The number of processes} \cdot \text{Lots)]}$$
$$= 8 \text{ Lots}$$

As can be seen from the above description, a proper number R of in-process lots can be obtained by using the formulae 1 to 5 according to the embodiment 1. When lots are stacked before each of the apparatuses 40 or the like so as to be equal to a proper number of in-process lots, then a target of the number Cg of processing lots can be achieved. That is, a work load to examine the places of the respective lots 50 in the processing order is reduced, all the lot flows come into a state where the individual lots move at a constant speed like a steady flow, an accuracy in scheduling of deliveries and so on is improved and the target of the number Cg of processing processes can be achieved while degradation of the lot flows is prevented from occurring in advance.

Embodiment 2

A processing method for the apparatus 40 or the like used in computation in the above described embodiment 1 is that of one lot processing as shown in FIG. 2. When one lot in 50a1 is processed in the apparatus 40, a subsequent lot in 50a1 cannot be processed till completion of the processing of the one lot in 50a1. There is only one lot out 50a2 which has completed the processing. However, for example, in a processing method in which two lots complete respective processings simultaneously, starting the respective processings at the same time point, it can be appropriate to simply double a proper number R of in-process. Now, in the following embodiment, description will be made of a method for obtaining a proper number R of in-process lots in a case where a processing method as shown in FIG. 2 is adopted.

Figure 4:
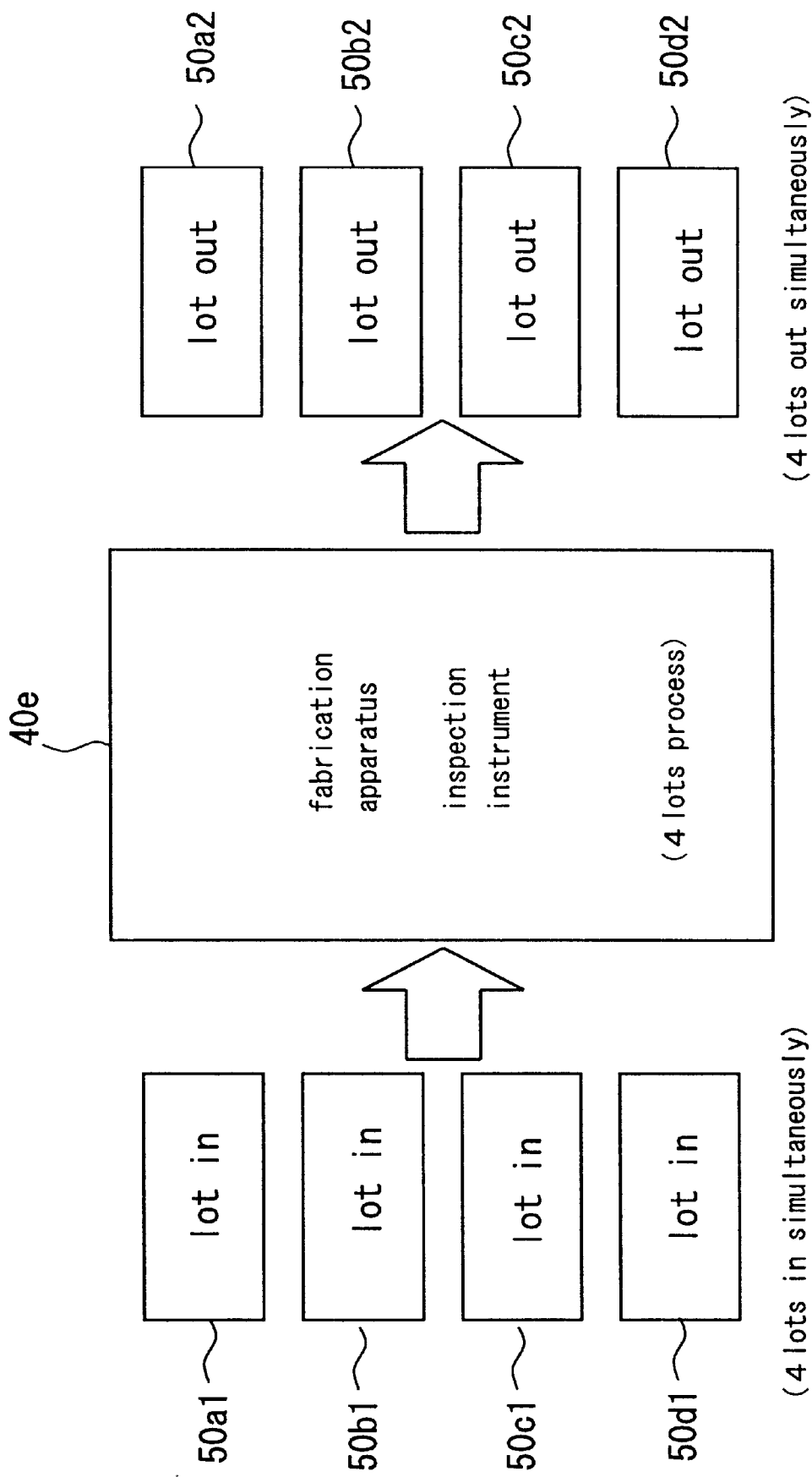
FIG. 4 shows an apparatus used in a method for processing a plurality of lots simultaneously in an embodiment 2 of the present invention.

FIG. 4 shows an apparatus used in a method for processing a plurality of lots simultaneously in an embodiment 2 of the present invention. In FIG. 4, symbols 50a1, 50b1, 50c1 and 50d1 denote lots in, symbols 50a2, 50b2, 50c2 and 50d2 denote lots out and a symbol 40e denotes an apparatus or the like that can process a plurality of lots in. As shown in FIG. 4, the apparatus 40e processes 4 lots in 50a1 simultaneously and after completion of the processing, the apparatus 40e unloads the 4 lots out 50a2 simultaneously. In this case, the apparatus 40e has a processing space accommodating 4 lots in therein. For example, a vertical furnace is available as the apparatus 40e, which can be used in an oxidation/diffusion process. In FIG. 4, while the number of simultaneously processible lots is 4, this is adopted for convenience in description and there is no specific limitation on the number of simultaneously processible lots. Furthermore, three lots can also be simultaneously processed in the apparatus 40e which can simultaneously process the maximum of 4 lots-in therein. In this case, it is said that the number of lots processed simultaneously is reduced from 4 to 3. That is, as a result, a processing capacity of the apparatus 40e is reduced. As one of causes for generation of such a situation, it can be conceived because simultaneous processing has a restriction that the simultaneous processing can apply to only lots which have the same processing conditions. Even if 4 lots-in in process (50a) are available but only three lots-in have the same film thickness to be deposited (one kind of the processing conditions), the number of lots processed simultaneously is reduced to 3.

In the method for processing a plurality of lots simultaneously shown in FIG. 4, a proper number R of in-process lots is obtained by doing as follows. First, an average of the number of lots processed simultaneously is obtained using processing histories (160, 170 and so on) of the apparatus 40 or the like. An object term for retrieval is one month as a unit and data of a previous month is used as data of the current month in consideration for computation. When lots are simultaneously processed, the number of lots with the same date and time is the number of lots processed simultaneously since processing dates and times of the respective lots coincide with one another. Hence, the numbers of lots with the same date and time in the apparatuses 40 is averaged, which average is denoted by b.

Track record of the number of lots processed simultaneously=$b$ \hfill (Equation 6)

If a proper number of in-process lots in the method for processing a plurality of lots simultaneously is denoted by Rb, the proper number Rb of in-process lots can be defined as follows:

$$Rb = R \times b \times Kb \quad \text{(Equation 7)}$$

where Kb denotes a adjustment parameter of an arbitrary value. As the adjustment parameter Kb increases to be larger than 1, a proper number Rb of in-process lots increases and there arises a higher possibility of increase in the number of lots processed simultaneously, while a waiting time is longer. Contrary to this, as the adjustment parameter Kb decreases to be smaller than 1, there arises a higher possibility of decrease in the number of lots processed simultaneously, while a waiting time is shorter. Hence, there arises a need for adjustment according to increase or decrease in waiting time. For example, Kb=1 can be adopted. A proper number Rb of in-process lots is stored in the field 212 for proper numbers of in-process lots of the new in-process management file 200.

As can be seen from the above description, according to the embodiment 2, a proper number of in-process lots in a case where the method for processing a plurality of lots simultaneously is adopted can be obtained with the use of the equations 6 and 7. A waiting time can be adjusted by the use of an adjustment parameter.

Embodiment 3

Figure 5:
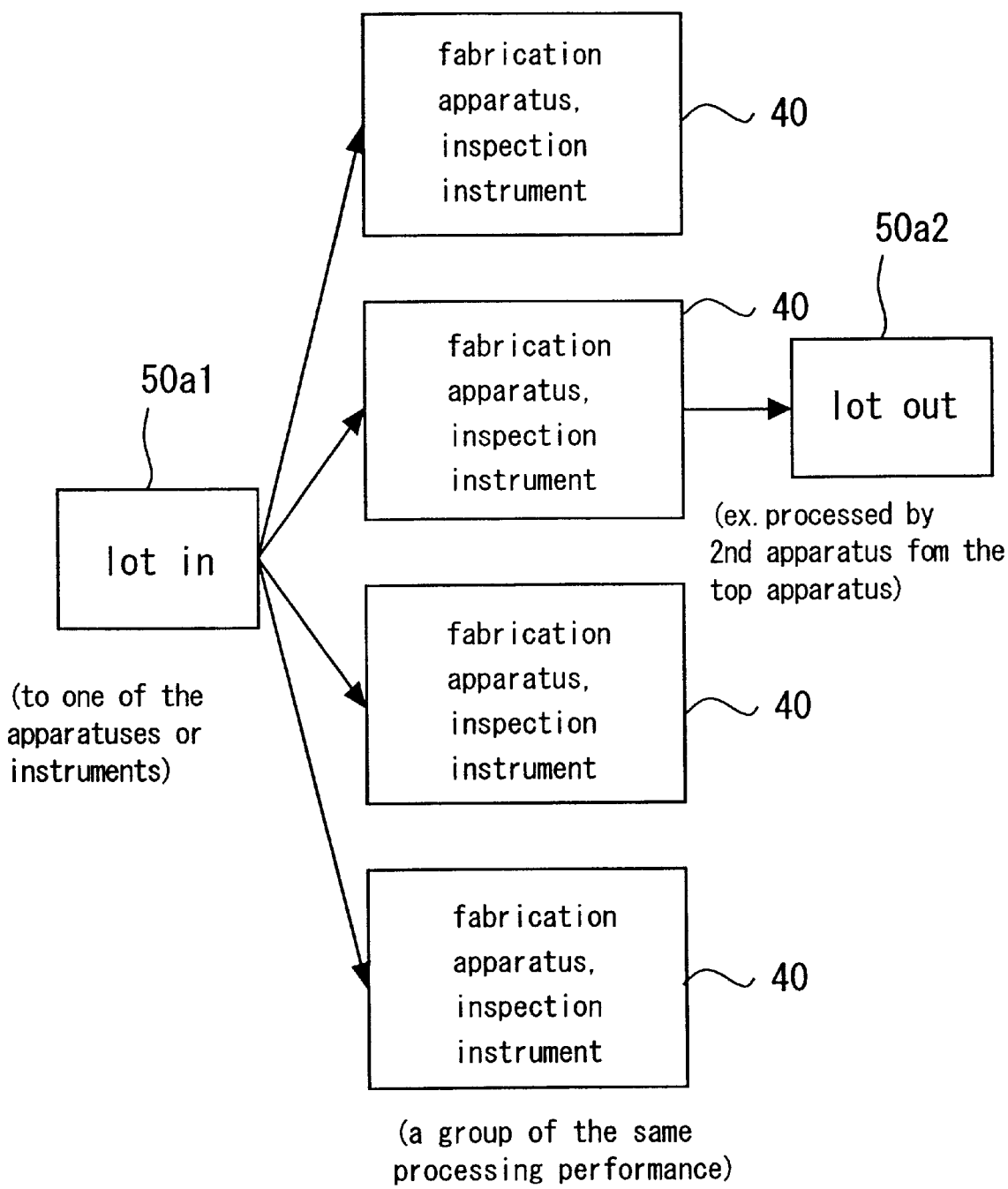
FIG. 5 shows an apparatus used for a method for substitute processing in an embodiment 3 of the present invention.

FIG. 5 shows an apparatus used for a method for substitute processing in an embodiment 3 of the present invention. In FIG. 5, constituents with the same symbols as those in FIGS. 1 to 4 are of the respective same functions as those of the constituents corresponding in the figures and therefore, descriptions thereof are omitted. In general, there are many cases in which a plurality of apparatuses 40 each with the same processing performance are employed. For example, 20 to 30 Steppers m (40a)are generally arranged in one semiconductor fabrication line. As shown in FIG. 5, in a case where 4 apparatuses 40 each with the same processing performance are arranged, a lot 50a1 can be processed in any one of the apparatuses 40. Therefore, even if in-process lots is accumulated in number more than a proper number R of in-process lots in one apparatus 40, for example a fabrication apparatus 40 located at the place second to the top place, the lots in accumulation can be processed as scheduled with no delay by transferring some of work load to another or other apparatuses 40.

If a proper number of in-process lots in a method for substitute processing is denoted by Rr, Rr can be defined as in a Equation 8:

$$Rr = R \times (1 + r \times Kr) \quad \text{(Equation 8)}$$

where r denotes the number of units other than the apparatus itself in consideration in which the processings can be performed as substitutes for the unit in consideration and Kr denotes an adjustment parameter of an arbitrary value: for example, Kr=0.2 can be adopted. A standard for adjustment time is increase or decrease in waiting time. In this case, discussion is conducted with a processing method for one lot as a premise. A proper number Rr of in-process lots can be stored in the field 212 for the proper number of in-process lots of the in-process management file 200. In a case where an individual apparatus 40 processes a plurality of lots simultaneously with no limitation to one lot processing, the Equation 7 is used even if a substitute processing is applicable to the case. An influence of substitute processing can be absorbed by adjusting a proper number Kb of in-process lots.

As can be seen from the above description, according to the embodiment 3, a proper number of in-process lots in a case where a method for substitute processing is adopted can be obtained with the use of the Equation 8. As a result, in a case where lots are accumulated in number more than a proper number R of in-process lots for one fabrication apparatus 40, the lots in accumulation can be processed as scheduled with no delay since part of processing allocated originally can be transferred to another or other apparatuses 40.

Embodiment 4

Figure 6:
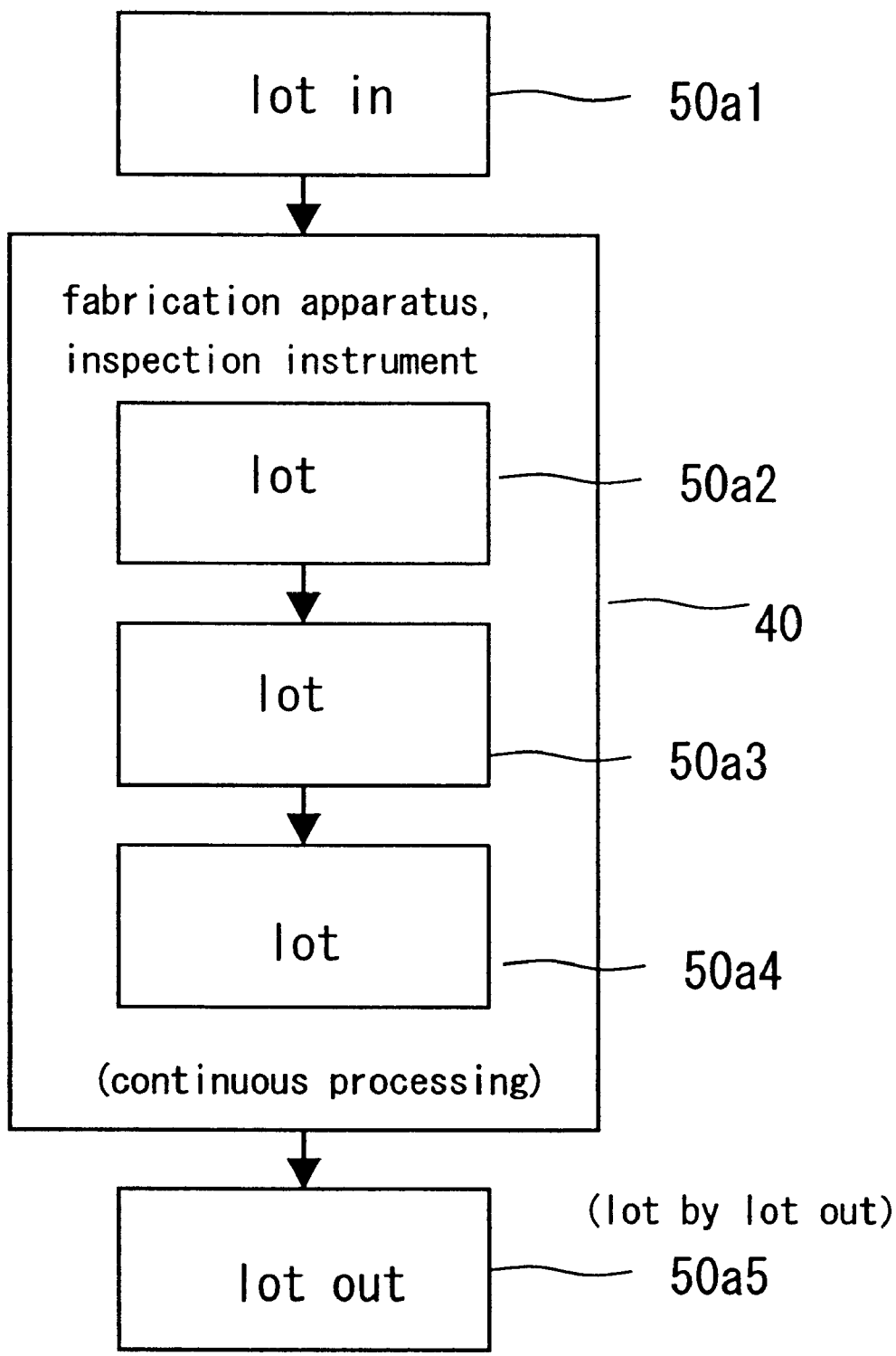
FIG. 6 shows a processing method for continuous processing in the embodiment 4.

In an embodiment 4, description will be made of a processing method other than those described above. FIG. 6 shows a processing method for continuous processing in the embodiment 4. In FIG. 6, a symbol 40 denotes an apparatus or the like, a symbol 50a1 denotes a lot in, symbols 50a2 to 50a4 denote lots charged into the apparatus 40 or the like and a symbol 50a5 denotes a lot out. As shown in FIG. 6, even when no one lot out 50a5 is unloaded, lots in 50a1 can be loaded one by one if a free space is available in the apparatus 40 till a processing space is fully occupied. In FIG. 6, since three spaces are available, the maximum of three lots 50a2, 50a3 and 50a4 can be put into the apparatus 40. Furthermore, there occurs no passing of the lot 50a2 or the like in the interior of the apparatus 40. As a typical apparatus 40, for example, a wet etching apparatus can be named, which can be applied to a cleaning process as a main one.

Figure 7:
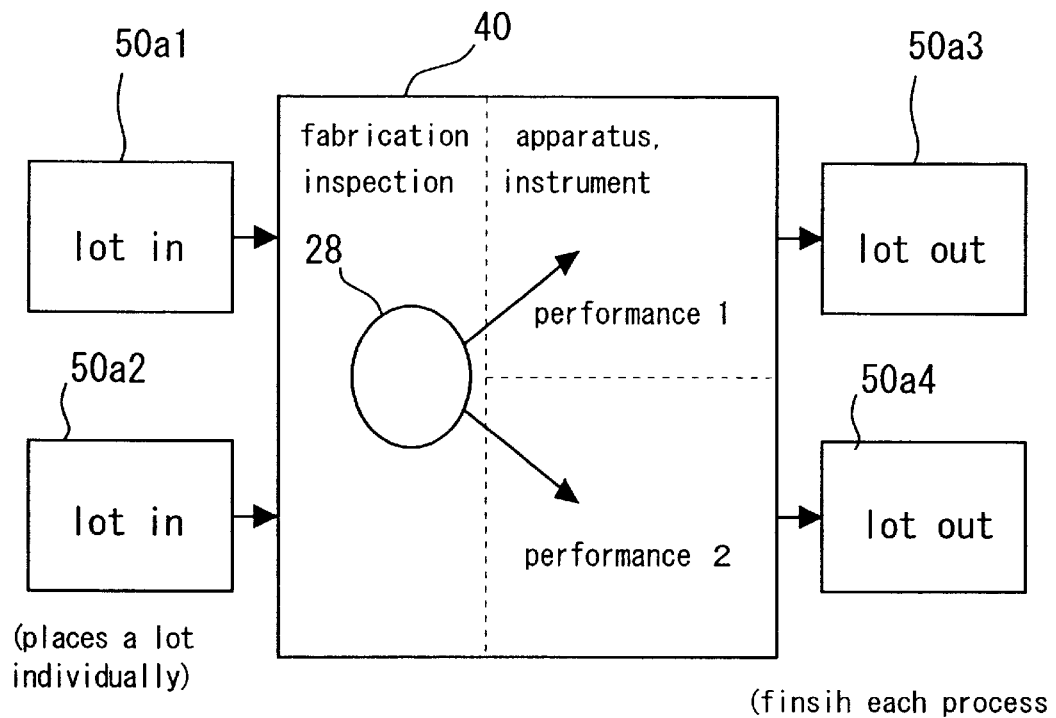
FIG. 7 shows a processing method for parallel processing in the embodiment 4 of the present invention.

FIG. 7 shows a processing method for parallel processing in the embodiment 4 of the present invention. In FIG. 7, a symbol 40 denotes apparatus 40 or the like, symbols 50a1 and 50a2 denote lots in, symbols 50a3 and 50a4 denote lots out, and a symbol 28 denotes a wafer transport robot in the apparatus 40. As shown in FIG. 7, the lots in 50a1 and 50a2 can be separately loaded into the apparatus 40. The transport robot 28 in the apparatus 40 pulls out a wafer from the lot in 50a1 and transfers the wafer into one of the processing spaces. The processing spaces are separated with respective performances 1 and 2, and can provide different processes, respectively. The lots out 50a3 and 50a4 on which the processings have completed are separately unloaded. The apparatus 40 employs a composite processing function in which processings are carried out like two units of the apparatus in one unit. As a typical fabrication apparatus 40, for example, a multi-chamber CVD apparatus can be named, which can be applied to a process of deposit film formation mainly from a Si compound.

If a proper number of in-process lots in a processing method in the embodiment 4 of the present invention is denoted by Ra, Ra can be defined as in a Equation 9 shown below:

$$Ra = R \times Ka \qquad \text{(Equation 9)}$$

where Ka denotes an adjustment parameter of an arbitrary value and Ka=1.2 can be adopted for example. A standard for adjustment is increase or decrease in waiting time. A proper number Ra of in-process lots can be stored in the field 214 for an adjustment proper number of in-process lots of the new in-process management file 200.

As can be seen from the above description, according to the embodiment 4, a continuous processing and a parallel processing in a case where a plurality of processing spaces in one apparatus are available can be carried out with the use of the Equation 9.

Embodiment 5

Figure 8:
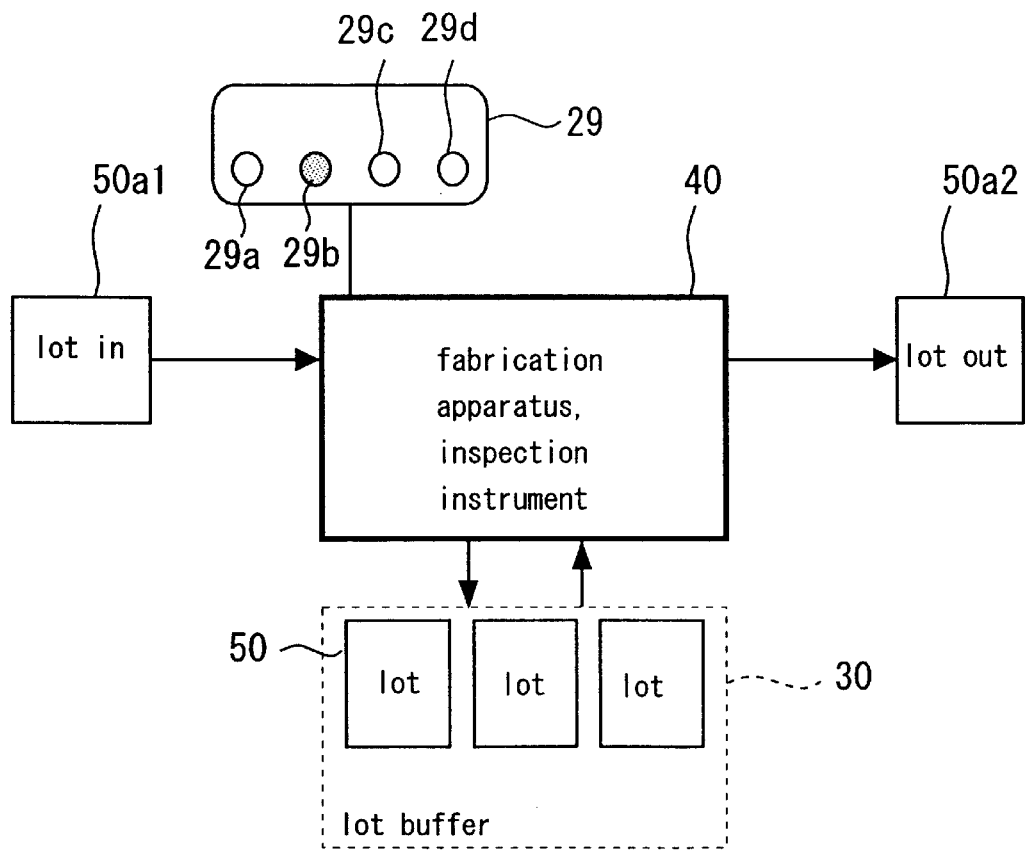
FIG. 8 describes a identification method for a lot flow state in a fabrication apparatus with the use of a principle of signal lights in an embodiment 5 of the present invention.

FIG. 8 describes a identification method for a lot flow state in a fabrication apparatus with the use of a principle of signal lights in an embodiment 5 of the present invention. In FIG. 8, a symbol 29 denotes a four-color signal including an orange signal light 29a, a blue signal light 29b, an yellow signal light 29c and a red signal light 29d, a symbol 30 denotes a lot buffer storing in-process lots 50 which are not processed yet, a symbol 40 denotes a fabrication apparatus having two kinds of states of GO and STOP, a symbol 50a1 denotes lots in, and a symbol 50a2 denotes lots out. The term "GO state" denotes a state in which a lot can be processed and the term "STOP state" denotes a state in which a lot cannot be processed because of maintenance or failure. There are three in-process levels comprising FULL, NORMAL and EMPTY for the lot buffer 30 and it can be shown whether or not an actual number of in-process lots is large using the levels. The actual numbers of in-process lots can be quantitatively defined with the use of the following formulae 10 to 12:

The number of lots at in-process level Full=$Rx \times F$ (Equation 10)

The number of lots of at in-process level NORMAL=$Rx$ (Equation 11)

The number of lots of at in-process level EMPTY=$Rx \times E$ (Equation 12)

where Rx denotes a proper number of in-process lots, a subscript x denotes no subscript (corresponding to R), b (corresponding to Rb), r (corresponding to Rr) or a (corresponding to Ra) and F and E denote adjustment parameters: for example, F=2 (times) and E=0.75 (time) can be adopted.

FIG. 9 shows color allotment for signal lights of a signal 29 in the embodiment 5 of the present invention. As shown in FIG. 9, a priority order for lot processing in connection to a signal color, a state of the apparatus and a lot buffer are defined. Four signal colors are provided as described above: which are of red, yellow, blue and orange. There are two kinds of states of the apparatus: GO state and STOP state. A lot buffer denotes a relation between a signal color and an in-process level of the lot buffer and, for example, in a case where a signal color is of yellow, the lot buffer denotes that it is larger than NORMAL but smaller than FULL, while in a case of a signal color is of blue, the lot buffer denotes that it is smaller than NORMAL but larger than EMPTY. There is no necessity for limitation to four kinds of colors of signal lights, but any number of colors may be adopted. For example, in a case where three kinds of colors are adopted, a yellow color is excluded and a field of a blue color of the lot buffer is designed to be smaller than FULL and larger than EMPTY. The priority order for lot processing is an order for a signal color. From FIG. 9, it means that a lot 50 in orange is processed ahead of a lot 5 in red, which processing, in other words, follows processing of a lot 50 in orange.

A lot in 50a1 having the next step at which the apparatus 40 is provided is processed in another apparatus so as to retain a proper processing order, in a case of a red signal color or the like when confirming a signal color of the signal 29 of the apparatus 40. Furthermore, a lot out 50a2 is processed in the apparatus 40 such that the unload order of the lot out 50a2 is in conformity with a signal color of the fabrication apparatus at the next process. The signal 29 of the fabrication apparatus 40 can be used as described above.

As can be seen from the above description, according to the embodiment 5, a previous process of a fabrication apparatus can process a lot confirming a signal color of a signal in the next process thereof since signals each displaying a color corresponding to an in-process level of lots residing in the lot buffer can be provided to the respective fabrication apparatuses.

Embodiment 6

Figures 10, 11:
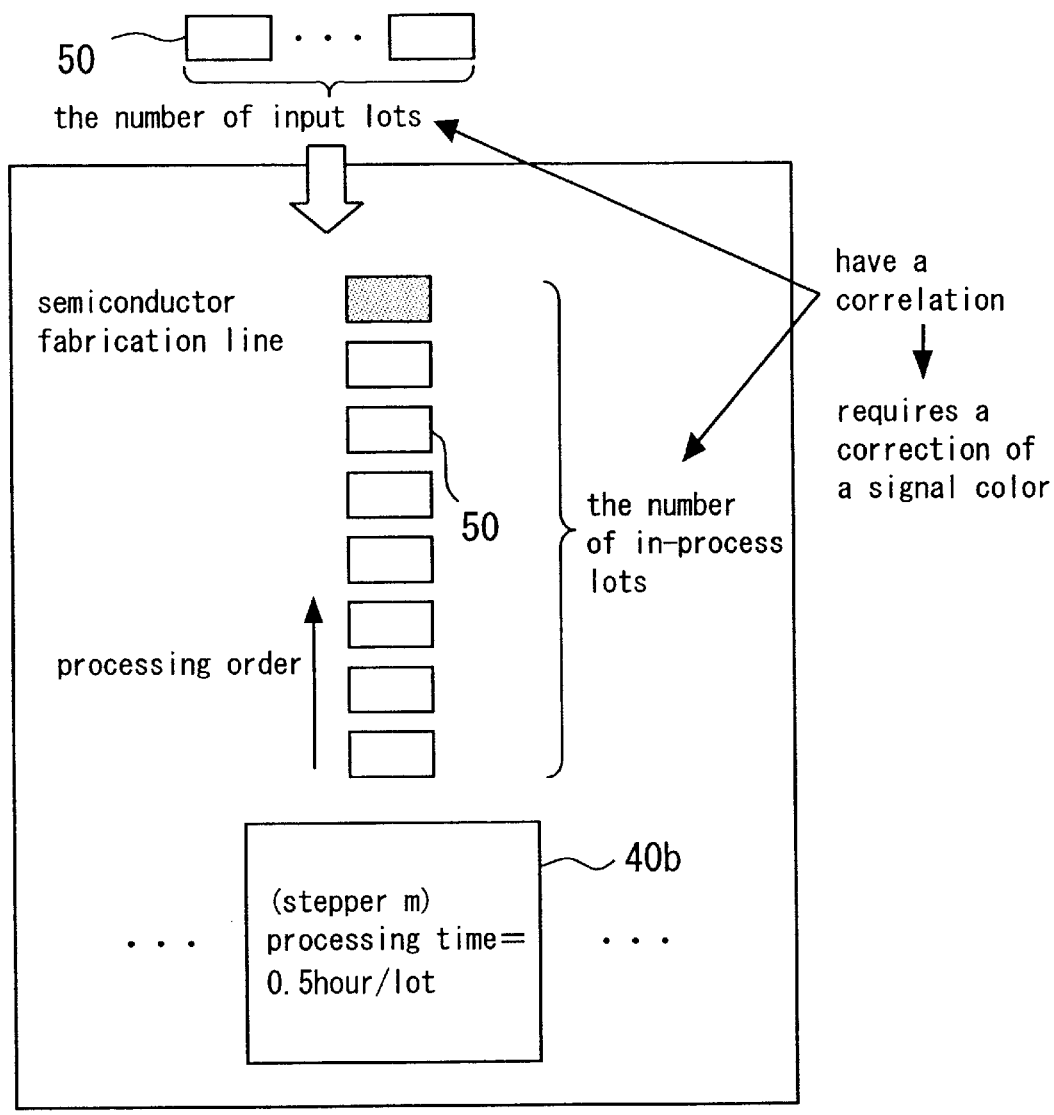
FIG. 10 shows a relation between a lot input amount to a semiconductor fabrication line and the numbers of in-process lots of respective apparatuses in an embodiment 6.
FIG. 11 shows a result of trial computation of a proper lot input amount in FIG. 10.

FIG. 10 shows a relation between a lot input amount to a semiconductor fabrication line and the numbers of in-process lots of respective apparatuses in an embodiment 6. In FIG. 10, a symbol 50 denotes lots input to the semiconductor fabrication line, a symbol 40b Stepper, and a symbol 50 in-process lots in Stepper 40b. Stepper 40b is exemplarily shown and may be replaced with another apparatus 40 or the like. The relation between a lot input amount to the semiconductor fabrication line and each of the numbers of in-process lots of the respective apparatuses is qualitatively such that as the lot input amount decreases, the number of in-process lots is smaller. However, with no further special approach, this relation cannot be discriminated from reduction in the number of in-process lots in an apparatus due to abnormality in a lot flow at the previous step. Therefore, a measure is taken in order to enable the discrimination, in which a correlation between a lot input amount and the number of in-process lots is grasped as a quantitative relation and next, the relation is used to properly correct a way of illumination of the signal 29. The correlation between a lot input amount and the number of in-process lots can be made clear in a quantitative manner by an approach including three steps described below.

First step: to present a proper lot input amount under given preconditions.

Second step: to verify whether or not the proper lot input amount presented is correct.

Third step: to estimate a generally proper lot input amount based on contents of the presentation.

The Given conditions in the first step are those shown below:

$Cg=5$ [The number of processes/(Days·Lots)]

$TPave=1$ [Time/The number of processes]

$Wtave=4$ [Time/The number of processes]

$Peave=1$ [Time/(The number of processes·Lots)]

$R=4$ [Lots]

FIG. 11 shows a result of trial computation of a proper lot input amount in FIG. 10. As shown in FIG. 11, lots 50 in process in the stepper 40b include 5 lots of L1 to L5. A symbol Ln, where n represents a digit, denotes a lot 50 to be processed in Stepper 40b at the nth place. There are 5 lots 50 of L6 to L10 1 process earlier as viewed at Stepper 40b. Likewise, there are 5 lots 50 of L716 to L720 of 143 processes earlier as view at Stepper 40b4. That is, it is shown that groups each of 5 lots are arranged in 144 rows.

If a semiconductor fabrication line is operated in processing through all apparatuses from 0 process earlier to 143 processes earlier including Stepper 40b with no interrupts due to failures or the like, then arrangement of lots 50 as shown in FIG. 11 is an optimum lot input amount for one month when Stepper 40b performs processings. For example, when 10 lots 50 are provided 1 process earlier instead of 5 lots 50 of L6 to L10, a lot input amount is in excess, since lots more than a proper number of in-process lots are accumulated in a delay fashion at Stepper 40b even if no failure arises in Stepper 40b. Contrary to this situation, when only one lot 50 is provided 1 process earlier, lot shortage arises at the apparatus in consideration even with no failure in the previous process.

Figure 12:
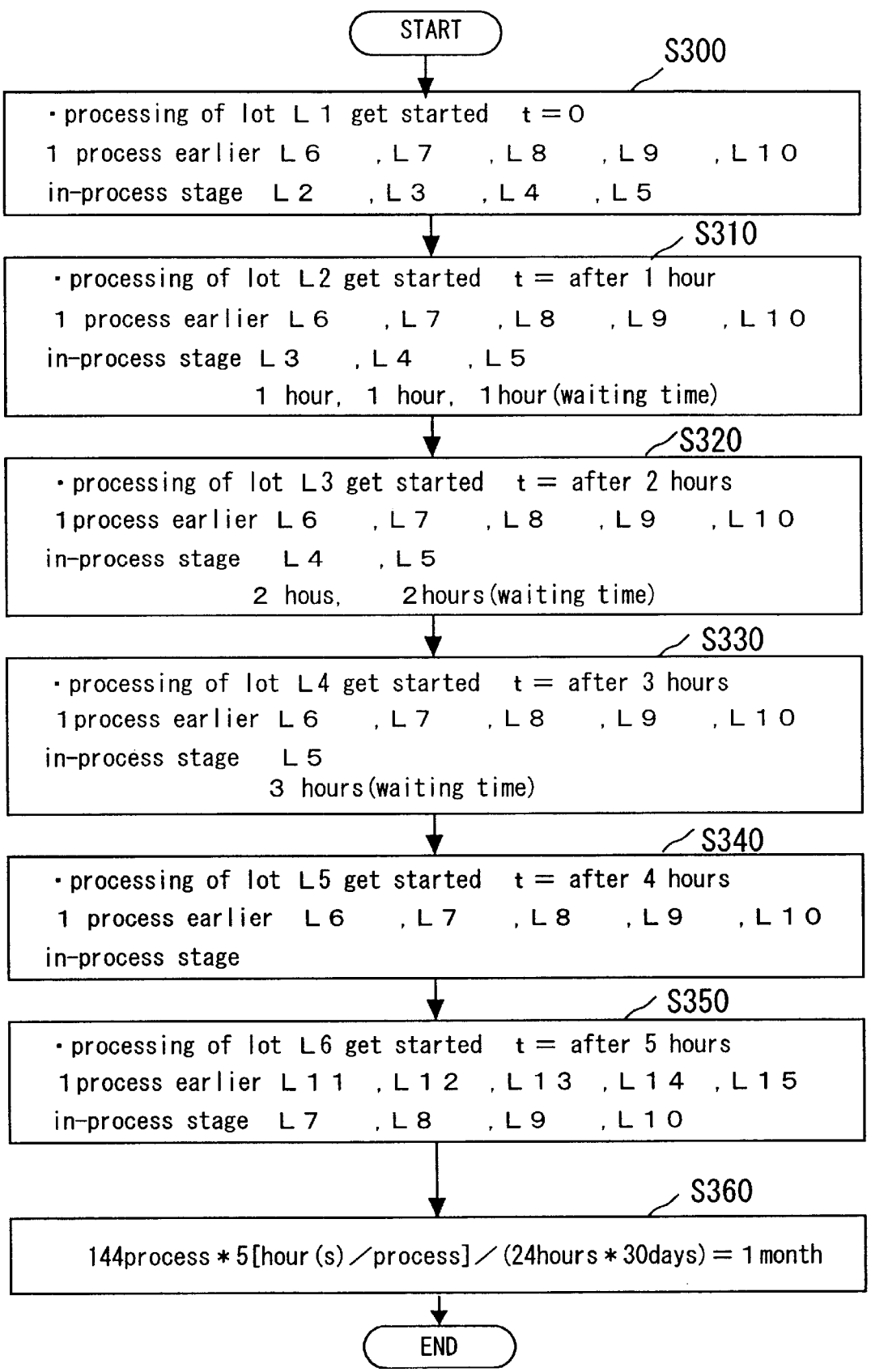
FIG. 12 shows a flow chart in which the result of trial computation is verified by showing how lots flow for each time period of one hour in the six embodiment.

The second step is a step where it is verified whether or not the result of trial computation is correct. FIG. 12 shows a flow chart in which the result of trial computation is verified by showing how lots flow for each time period of one hour in the embodiment 6. As shown in FIG. 12, processing of lot L1 get first started at a time point t=0. Now, the lot L1 disappears in the in-process stage and instead, the lots L2 to L5 are in process and the lots L6 to L10 are 1 process earlier as they were (step 300). Processing of the lot L2 gets started at t=after 1 hour, when the lots L3 to L5 are in process and the lots L6 to L10 are 1 process earlier as they were. Now, the lots L3 to L5 have awaited for 1 hour at the apparatuses 40, respectively (step 310). When processing of the lot L3 gets started at t=after 2 hour, the lots L4 and L5 are in process and the lots 6 to L10 are 1 process earlier as they were. Now the lots L4 and L5 have awaited for 2 hours at the apparatuses 40, respectively (step 320). When processing of the lot L4 gets started at t=after 3 hour, the lot L5 is in process and the lots 6 to L10 are 1 process earlier as they were. Now the lot L5 has awaited for 3 hours at the apparatus 40 (step 330). When processing of the lot L5 gets started at t=after 4 hour, no lot is in the in-process stage and the lots 6 to L10 are 1 process earlier as they were. Now the lot L5 has awaited for 4 hours at the apparatus 40 (step 340). When processing of the lot L6 gets started at t=after 5 hour, the lots L7 to L10 are in the in-process stage and the lots 11 to L15 are 1 process earlier as they were. That is, all the lot rows (each row of 5 lots) are now moved 1 process later (step 350). Doing as described above, it takes one month to process all the lots of 144 rows up to the process of 143 processes earlier including a lot row in the in-process stage at the time point t=0 (step 360). As can be seen from the above description, it has been shown that the arrangement of lots of FIG. 11 presented at the first step is a proper lot input amount.

FIG. 13 describes the third step in the embodiment 6 of the present invention. As described above, the number of previous processes when the number of lots at each step is R+1 can be obtained from the preconditions of the first step and the trial computation shown in FIG. 11 using the following Equation 13 provided that an in-process stage is counted as one process.

$$\text{The number of previous processes [processes]} = 30 \text{ [days]} \times 24 \text{ [time]}/(Wtave+TPave) \quad \text{(Equation 13)}$$

Therefore, a proper input lot amount Rin of the apparatus in consideration per one month is obtained by the following Equation 14:

$$\text{(Equation 14)}$$
$$Rin \text{ [Lots]} = \text{The number of previous processes [processes]} \times (R+1) \text{ [Lots/The number of processes]}$$
$$= 30 \times 24 \times (R+1)/(Wtave + TPave)$$

FIG. 14 shows definitions for change in signal color depending on a lot input amount in the embodiment 6 of the present invention. In FIG. 14, a symbol Rinr denotes an actual input lot amount. A symbol Ko denotes an adjustment parameter and, for example, Ko can be set to 0.5. While the same color as before is illuminated if the actual input amount Rinr is larger than Ko×Rin, contrary to this, orange adopted currently is forcibly changed to blue if the actual input amount Rinr is smaller than Ko×Rin. The reason for orange to be forcibly changed to blue is to clearly discriminate between the following two states as well:

State (1), in which the number of lots to be processed is sufficient, but lot shortage arises in a short time period by flow abnormality at a previous step.

State (2), in which the number of lots is originally small and lot shortage is chronic.

When orange continues to be illuminated in the state (2), processing of unnecessary lots is accelerated, which is resulted in that the solution of a state like (1) is retarded, to the contrary, though the state like (1) should be solved as fast as possible.

As can be seen from the above description, according to the embodiment 6, since a correlation between an input lot amount and the number of in-process lots can be grasped in a quantitative manner, a way to illuminate a signal light of a signal can be properly corrected.

Embodiment 7

Figures 15, 16:
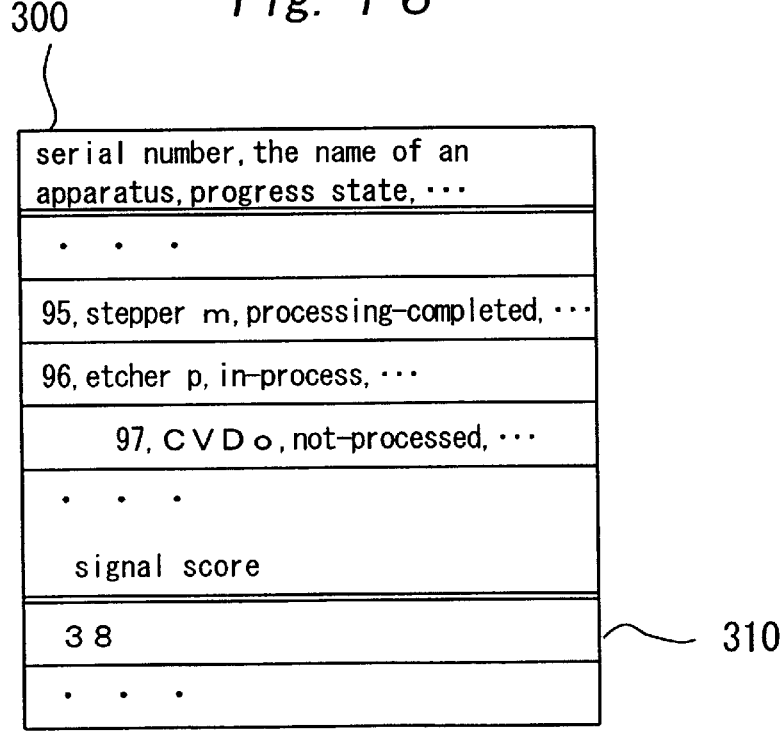
FIG. 15 shows a computation example of a signal score in an embodiment 7 of the present invention.
FIG. 16 shows a data base (DB) construction for a process flow in the embodiment 7 of the present invention.

FIG. 15 shows a computation example of a signal score in an embodiment 7 of the present invention. In FIG. 15, there are shown, for example, signal colors and signal scores over 5 processes for each of lots. Allotment of scoring points to signal colors are defined as follows, which descriptions will be give below:

Signal color point allotment for orange=1 Point

Signal color point allotment for blue=2 Points

Signal color point allotment for yellow=3 Points

Signal color point allotment for red=4 Points

With scoring point or points allotted to the above described colors, computation of a signal score can be carried out using the following Equation 15:

$$\text{Signal score} = n \times \text{Signal color point allotment} + (n-1) \times \text{Signal color point allotment} + \ldots + 2 \times \text{Signal color point allotment} + 1 \times \text{Signal color point allotment} \quad \text{(Equation 15)}$$

where n denotes the maximum number of the later processes to be referred, which can be arbitrarily set and, for example, n=5 as shown in FIG. 15 may be set. A point allotment for a signal color is any of 1 to 4 described above, provided that if the number of later processes is less than n, a signal color point allotment for the processes can be set to 0 in computation. Furthermore, when no lot is in process at the apparatus in consideration, computation can be effected with each of all signal color point allotments=4.

Computation formulae for signal scores in FIG. 15 will be shown below:

Signal score of lot $A$ (in process)=$5 \times 2 + 4 \times 2 + 3 \times 4 + 2 \times 3 + 1 \times 1 = 38$ points Signal score of lot $B$ (in process)=$5 \times 4 + 4 \times 2 + 3 \times 2 + 2 \times 2 + 1 \times 2 = 40$ points Signal score of lot $C$ (in process)=$5 \times 2 + 4 \times 2 + 3 \times 0 + 2 \times 0 + 1 \times 0 = 18$ points Signal score of lot $D$ (before one process)=$5 \times 4 + 4 \times 4 + 3 \times 4 + 2 \times 4 + 1 \times 4 = 60$ points Lateral short lines like a hyphen in spaces in columns of 3 to 5 processes later to and a row of lot C mean no process in FIG. 15. It can be understood that as a signal score decreases, a lot flow state of the subsequent process is better and furthermore, there is a few problem in a process close to the process in consideration.

FIG. 16 shows a data base (DB) construction for a process flow in the embodiment 7 of the present invention. A field 310 of signal scores is added as compared with the conventional process flow file 120 or the like. The signal scores computed, as shown in FIG. 15, are stored in the signal score field 310 of the process flow file 300.

As can be seen from the above description, according to the embodiment 7, with the signal scores, states of lot flows at subsequent processes or the like can be achieved since signal scores for lots can be obtained using the Equation 15.

Embodiment 8

FIG. 17 shows a sorting method in a normal state where the number of in-process lots is not extremely large in an embodiment 8. As shown in FIG. 17, there are 6 sorting object items and the sorting method comprises: first, rearranging data based on a sort item 1) (in-process positions), then, rearranging the data based on a sort item 2) (priority order), followed by rearrangements based on next other 3 sort items 3) to 5) and finally, further rearranging the data based on a sort item 6). (recipe). The term "in-process position" of 1) is to name such that a case where a lot is currently in process of an apparatus 40 is called a lot '0 process earlier,' a case where a lot is in the previous first process of the apparatus 40 is called a lot '01 process earlier,' a case where a lot is in the previous second process of the apparatus 40 is called a lot '02 process earlier,' and thereafter a previous process number as an in-process position is incremented by 1 in each repetition. The data are rearranged such that the in-process data is of the highest place (which comes first) in sorting and then the data '01 process earlier' comes second. The item of 2) is to sort the data to be in the ascending order based on priority numbers. A priority order is higher as a priority number decreases. The item of 3) is to sort the data to be in the ascending order based on signal scores. The item of 4) is to sort the data to be in the ascending order based on the number of wafers of each lot, which is because a processing time of an apparatus is apt to depend on the number of wafers. The item of 5) is to sort the data in the ascending order based on in-process date and time, which conventionally has been incorporated into the system as FIFO. The item of 6) is to sort the data in the ascending order based on recipe, which is adopted mainly for collection of the same kinds of recipe, wherein the term "recipe" means a processing program in an individual use for each apparatus, the program relating a control parameter with which processing control is performed in the apparatus.

FIG. 18 shows one example of set-up information for Etcher p in a case where the sorting method shown in FIG. 17 is applied. As shown in FIG. 18, priority numbers range from "01" to "03." The maximum of the number of wafers in each lot is normally 25 pieces. The numbers of wafers are variously mixed as shown in FIG. 18. While the recipes includes 4 kinds of "01," "31," "33" and "35," the programs thereof are generally constituted from alphanumeric characters in many cases.

As can be seen from the above description, according to the embodiment 8 of the present invention, since the sorting method in a normal state in which the number of in-process lots is not extremely large, sorting can be achieved according to various ascending orders of in-process position, priority order number, the number of wafer per lot, in-process date and time, and recipe.

Embodiment 9

FIG. 19 describes a sorting method in an abnormal state in which the number of in-process lots is extremely large in an embodiment 9 of the present invention. As shown in FIG. 19, since the sorting items are the same as those in the Embodiment 8, descriptions thereof are omitted. The embodiment 9 is different from the embodiment 8 in the processing order of the sorting items in order to decrease the number of in-process lots faster. The reason why the number of wafers of 3) ascends in the processing order is because as the number of wafers decreases, there is a higher possibility of a processing time of an apparatus being shorter. There are two kinds of ways to handle wafers in an apparatus: a single wafer scheme in which wafers are handled one wafer at a time and a multi-wafer scheme in which all the wafers of each lot may collectively be handled at a time. In a case where a single wafer scheme is adopted, an effect of upward shifting of the number of wafers as a sorting item in the processing order is clearly reflected on the processing time.

FIG. 20 is one example of set-up information for an ion implantation system in a case where the sorting method shown in FIG. 19 is used. In the ion implantation system, while, for example, several hour are required to change from As ion species to B ion species, processings with the same kind ion species can be effected in a collective manner by using the sorting method of the embodiment 9, which enables processing efficiency to increase.

As can be seen from the above description, according to the embodiment 9, since the sorting method in the abnormal state in which the number of in-process lots is extremely large, sorting can be achieved according to various ascending orders of in-process position, recipe, the number of wafer per lot, signal score, priority order number, and in-process date and time.

Embodiment 10

Figure 33:
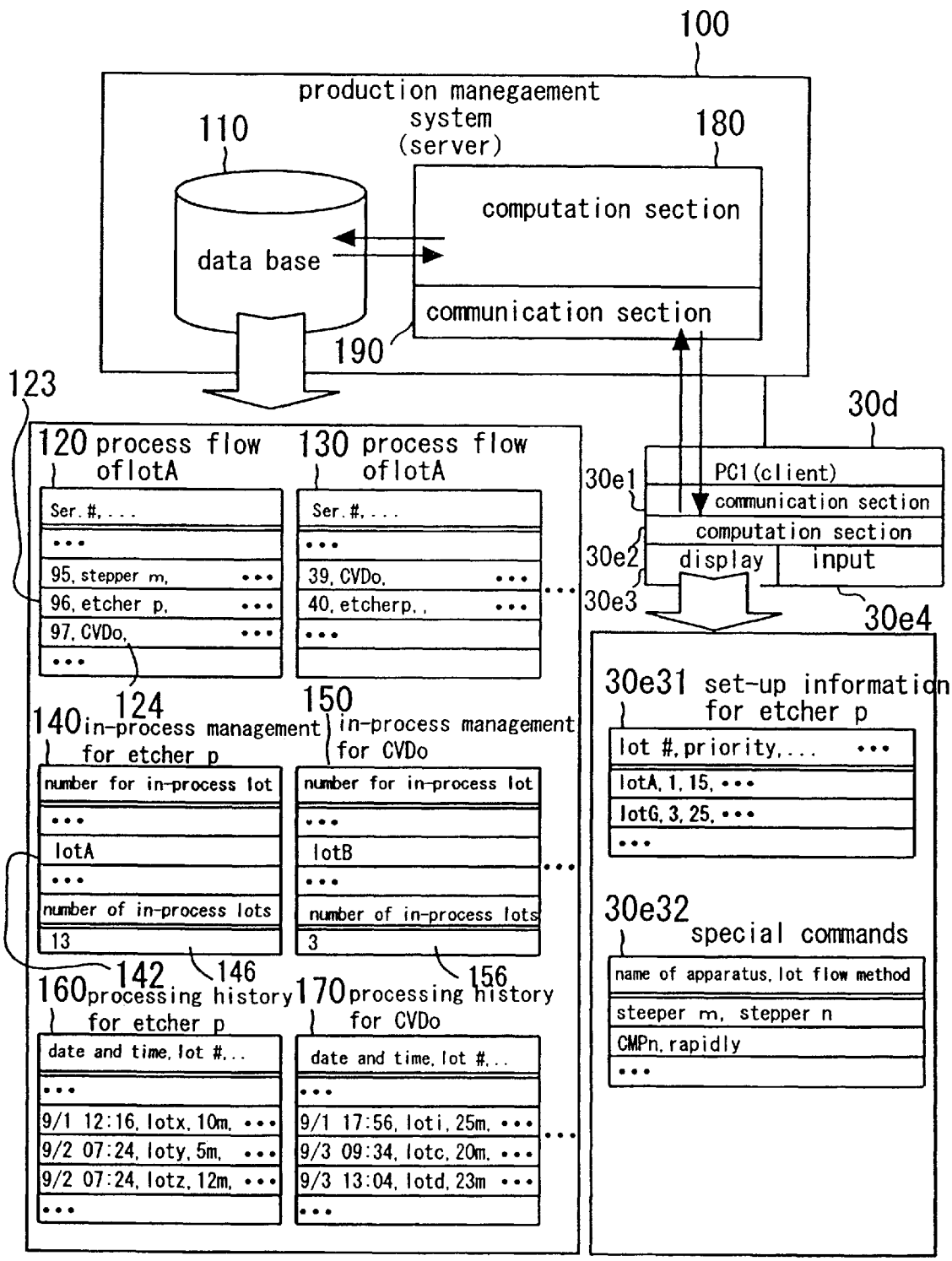
FIG. 33 shows internal constitution of the production control system (server) 100, the client 30 and others of FIG. 32.

An embodiment 10 of the present invention is an assembly as one system obtained by integration of methods shown in the first to embodiment 9s described above. As a semiconductor fabrication line, FIG. 32 same as a conventional one is employed. A production control system 100 is the same as a conventional one 100 shown in FIG. 33 except for a DB construction and a client display section. What is different from a conventional technique is that an in-process management file 200, a process flow file 300 and set-up information files 400 and 500 are employed. A function that progresses program flow by one process, and which is of an inner logic of the production control system 100 (see FIG. 34) and a lot flow control computation function (see FIG. 35) are changed as shown in FIGS. 21 to 23, respectively, which will be detailed below.

Figure 21:
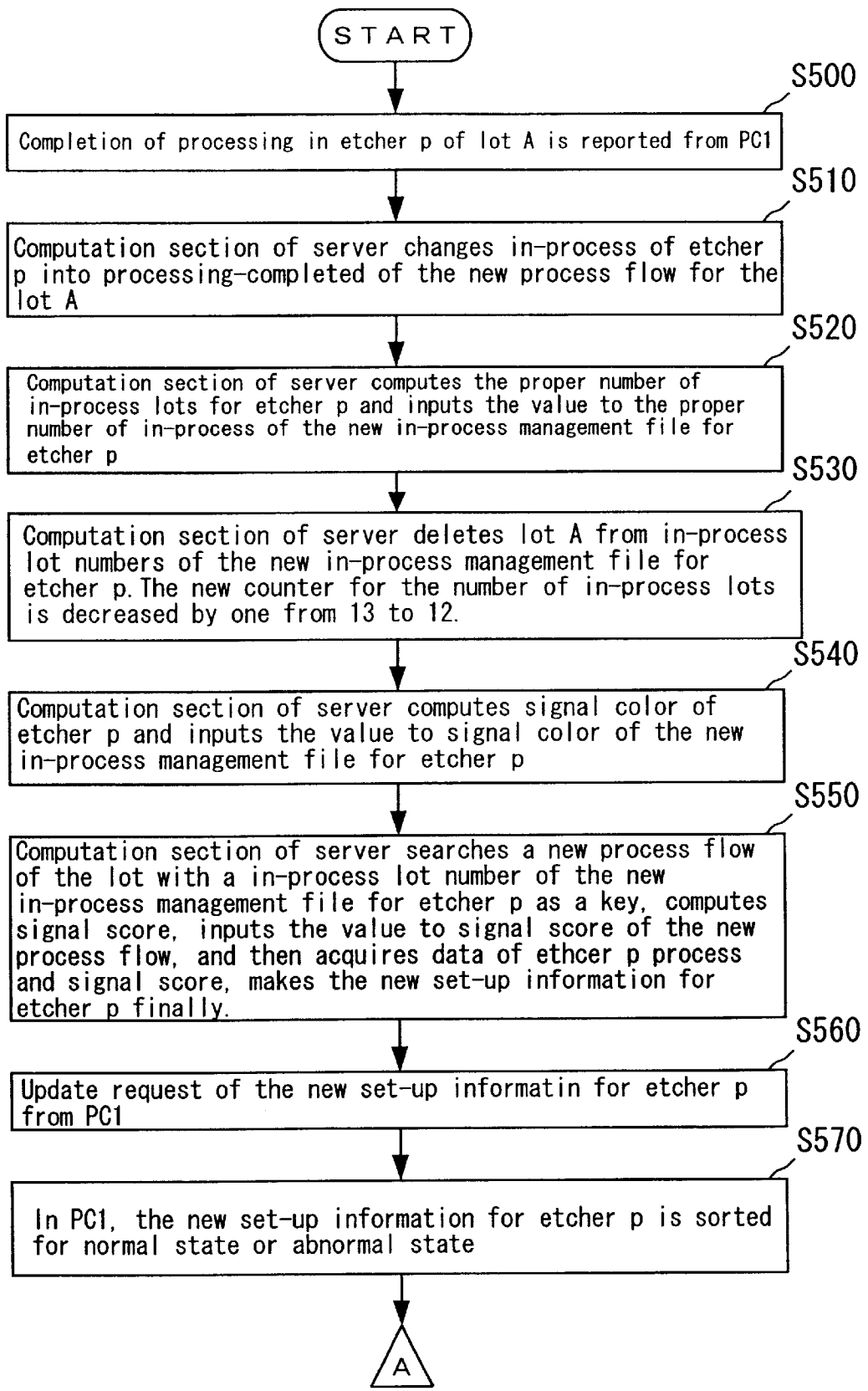
FIG. 21 shows a way to progress program flow by one process in the embodiment 10 of the present invention in a flow chart.
Figure 22:
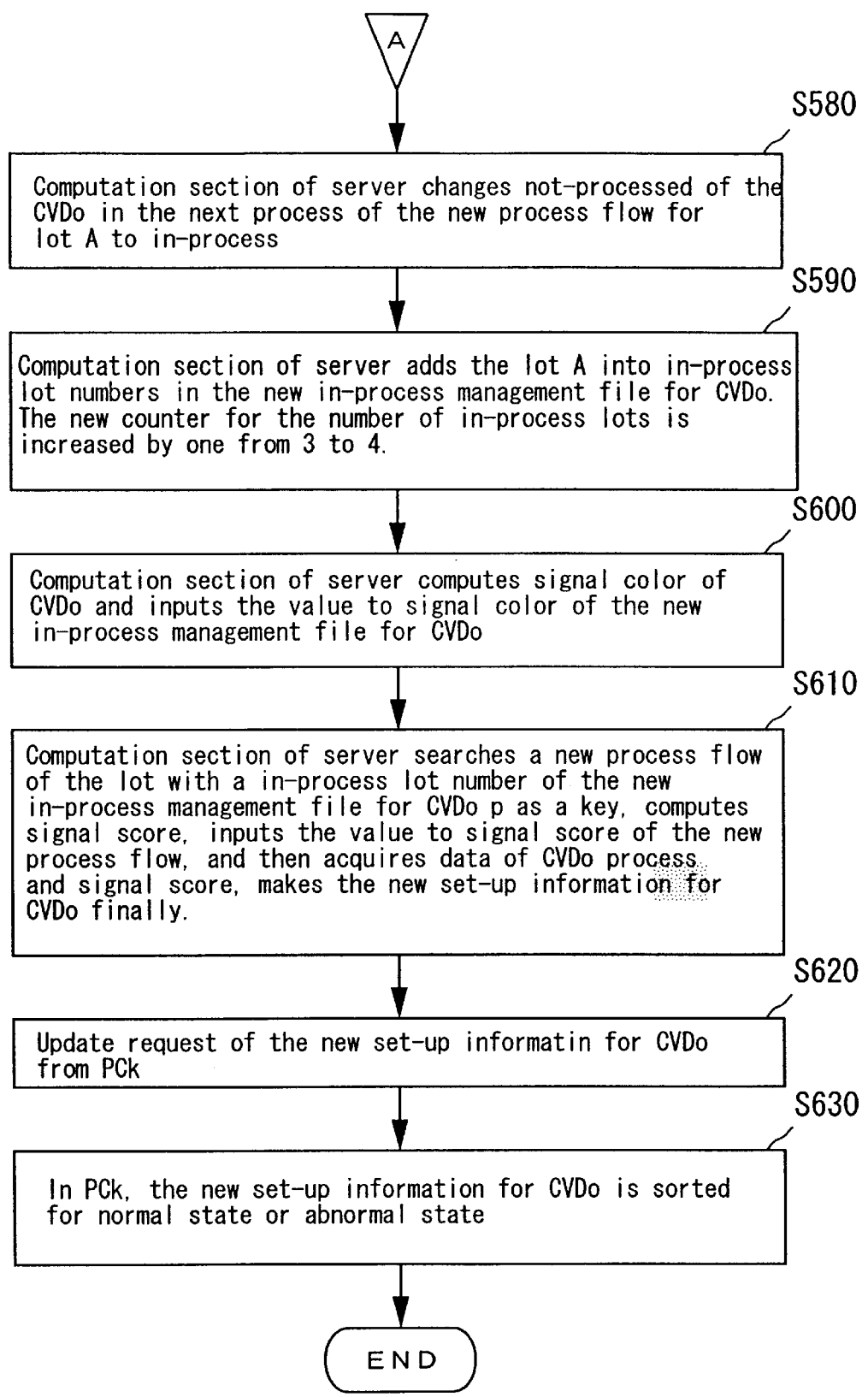
FIGS. 22 shows a way to progress program flow by one process in the embodiment 10 of the present invention in a flow chart.
Figure 34:
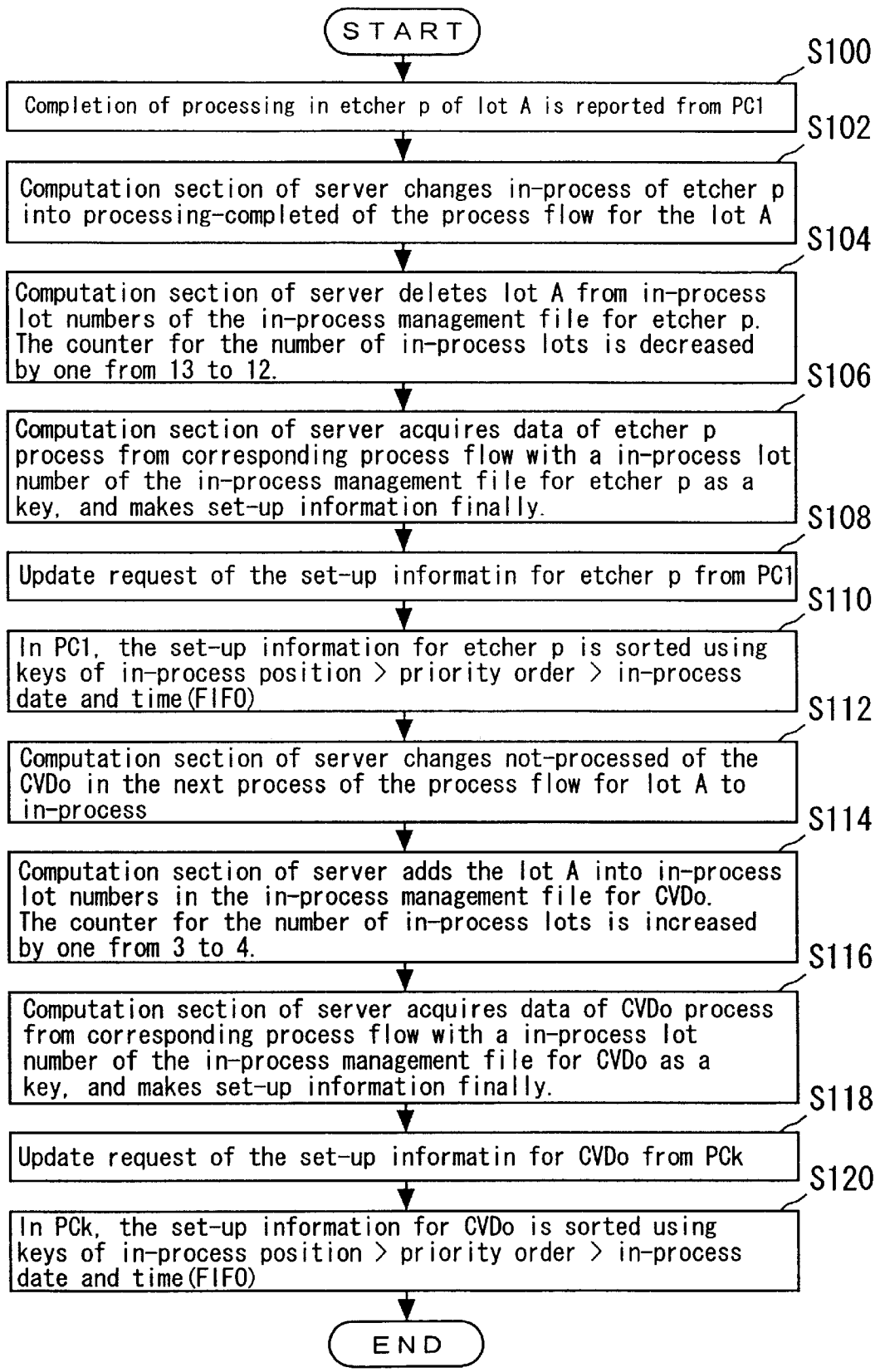
FIG. 34 describes workings of the production control system 100 shown in FIG. 33 using a flow chart, taking up a case where one process is progressed as an example.
Figure 35:
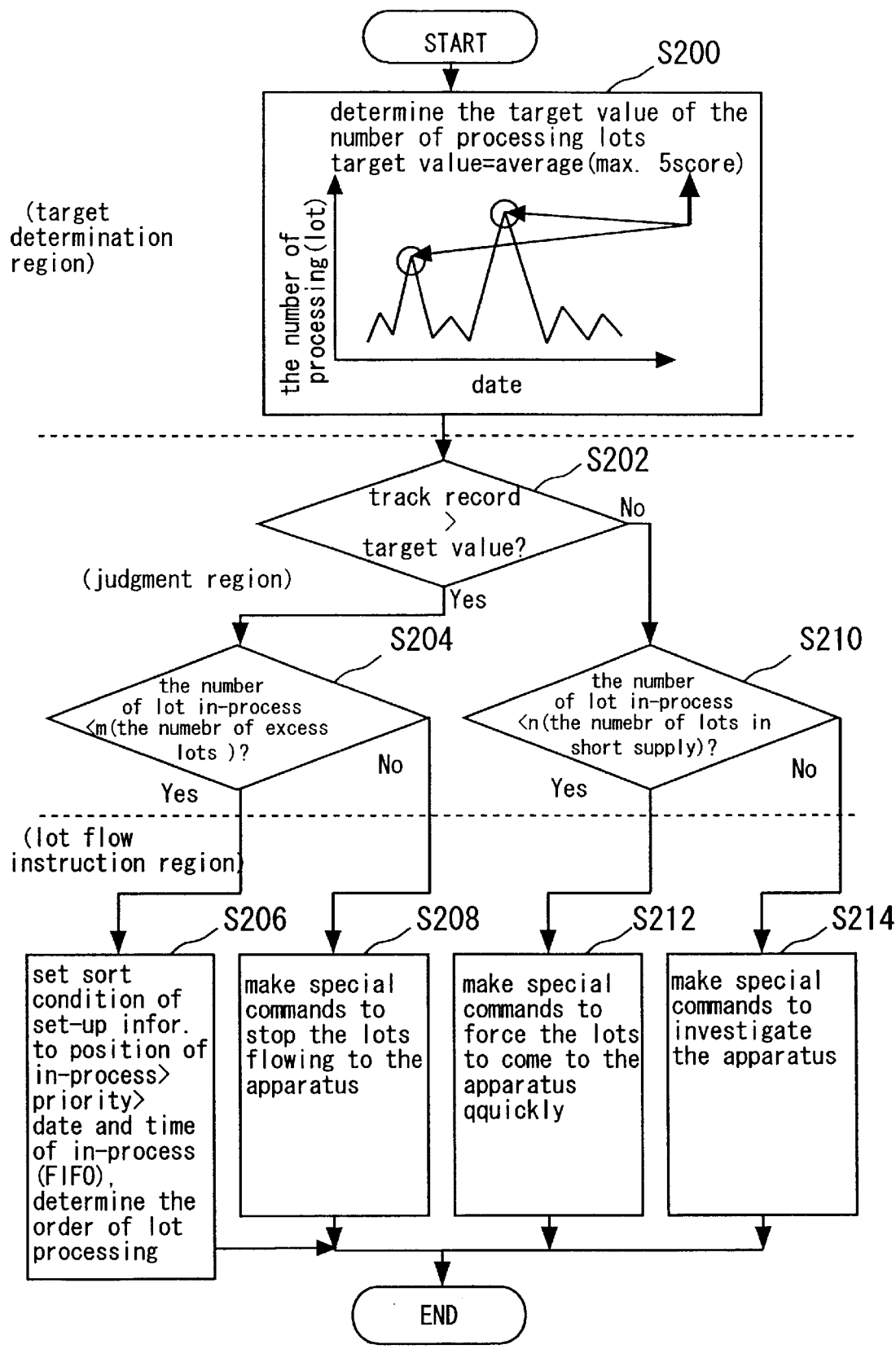
FIG. 35 shows a flow chart for a conventional lot flow control computation.

FIGS. 21 and 22 show a way to progress program flow by one process in the embodiment 10 of the present invention in a flow chart. Description will be focused on steps differing from the flow chart of FIG. 34 showing the conventional way described above. Since the other steps are similar to those conventional steps shown in FIG. 34, descriptions thereof are omitted. As shown in FIG. 21, step S510 is similar to step S102 with the exception that the process flow file 120 is changed to a process flow file 300. Step S520 is a new step and at the step, the proper number R of in-process lots and so on are computed and the results are stored. Step S530 is similar to step S104 with the exception that the in-process management file 140 is changed to an in-process management file 200. Step S540 is a new step and at the step, a signal color is judged and the value is stored. At step S550, which is different from step S106, the in-process management file 140 is changed to an in-process management file 200, the process flow file 120 is changed to a process flow file 300, the set-up information file 30e31 is changed to set-up information files 400 and 500, and furthermore, computation of signal scores and an operation to store the computation results are newly added. Step S560 is similar to step S108 with the exception that the set-up information file 30e31 is changed to set-up information files 400 and 500. Step S570 is similar to step S110 with the exception that the set-up information file 30e31 is changed to set-up information files 400 and 500, and the sorting method is of use either in a normal state or an abnormal state. Steps S580 to S630 shown in FIG. 22 are duplicate steps of steps S510 to S570 as is in a conventional flow chart, therefore, descriptions thereof are omitted. As shown in FIG. 22, since special instructions such as at step S208 and so on are unnecessary, which is different from the convention method, a load of set up can be reduced.

Figure 23:
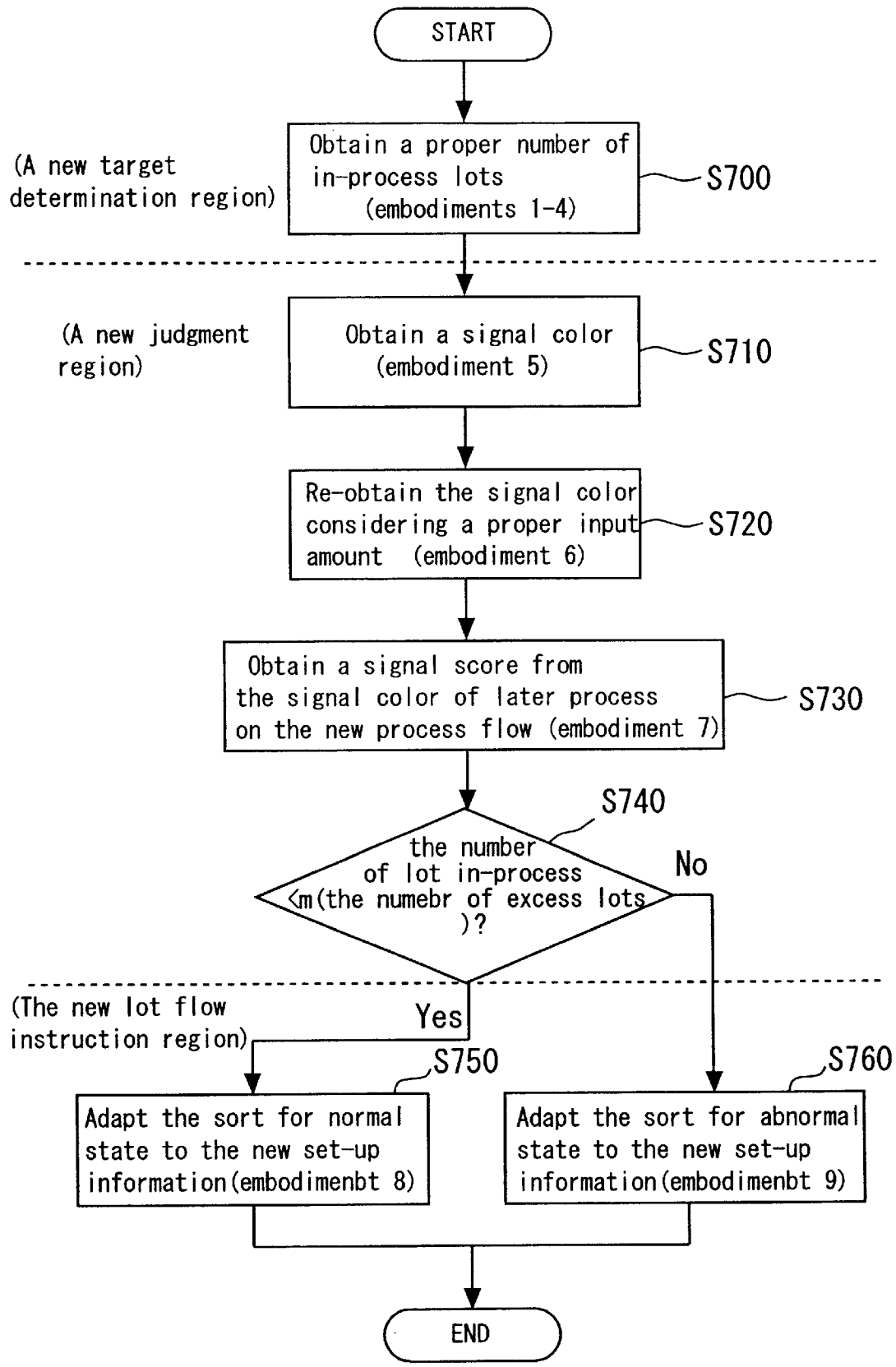
FIG. 23 shows lot flow control computation in the embodiment 10 of the present invention using a flow chart.

FIG. 23 shows lot flow control computation in the embodiment 10 of the present invention using a flow chart. As shown in FIG. 23, a new target determination region corresponds to step S700. First, a proper number of in-process lots is obtained using the method shown in the first or embodiment 4 (step S700). Computation formulae are expressed like the formulae 5, 7, 8 or 9 according to a processing way of an apparatus. The new judgment region is combination of steps S710, S720 and S730 and a conventional step S204 (step S740). Then, a signal color is obtained using the method shown in the embodiment 5 (step S710). Correction by a lot input amount on the signal color obtained is effected using the method shown in the embodiment 6 (step S720). A signal score is obtained using the method shown in the embodiment 7 (step S730). Finally, it is judged whether or not lots are extremely accumulated in process (step S740) and if not extremely accumulated in process, program flow goes to step S750 in a normal state, while if extremely accumulated in process, program flow goes to step S760 in a abnormal state. The number m of lots in excessive supply of step S740 is arbitrarily set but, for example, a value 2 times of a proper number R of in-process lots can be set to the number m. The new lot flow instruction region is constituted of step S750 for a normal state as shown in the embodiment 8 and step S760 for an abnormal state as shown in the embodiment 9.

Figure 24:
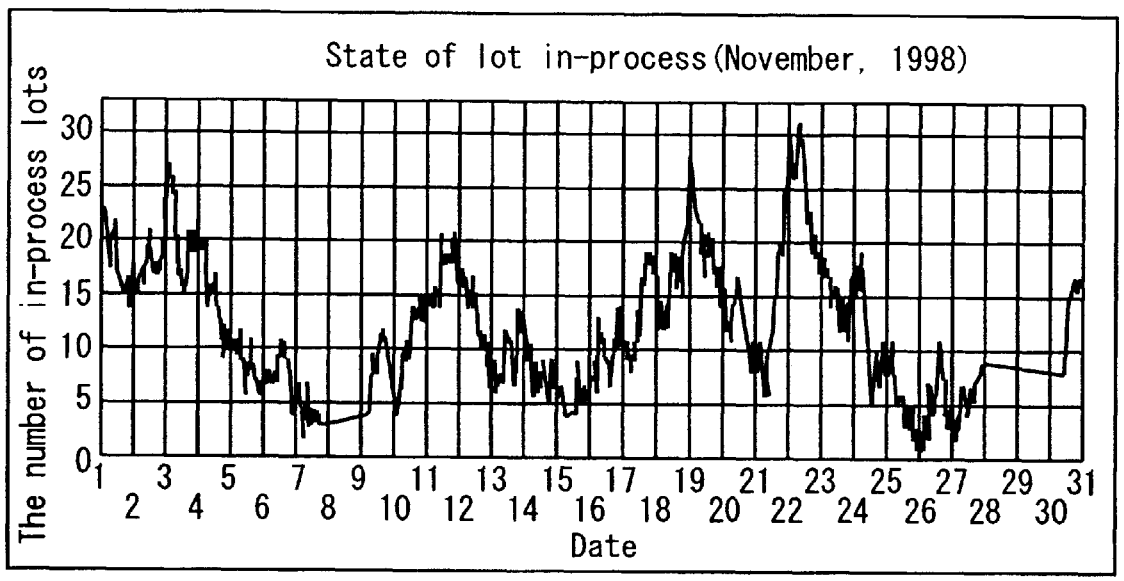
FIG. 24 shows a lot flow using a conventional method provided as reference data.
Figure 25:
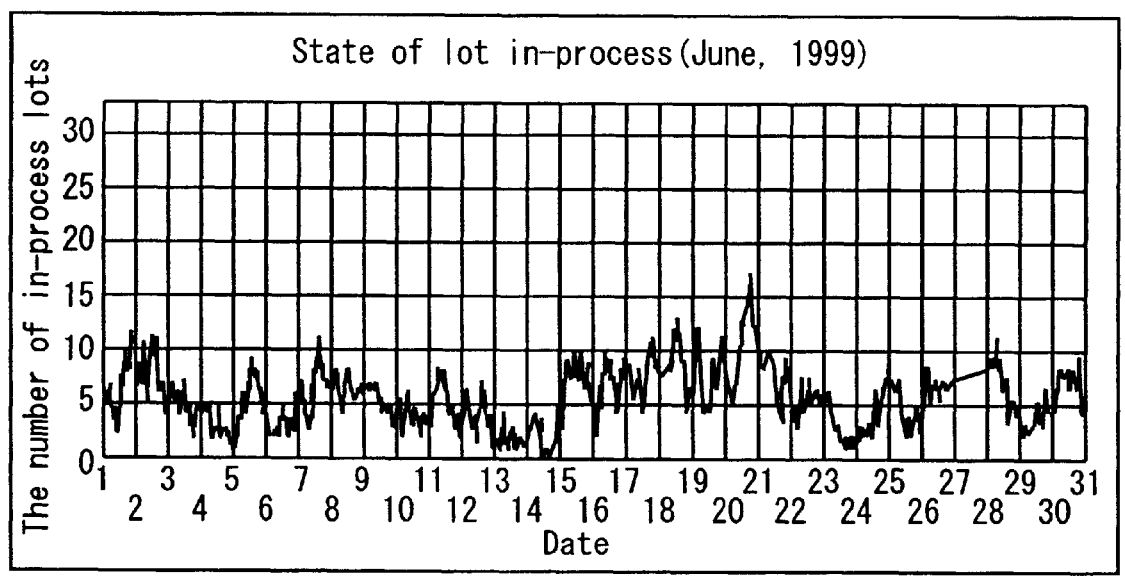
FIG. 25 shows a result of a lot flow in a case where the above described logic is incorporated into a production control system 100 and the production control system 100 is actually applied.

FIG. 24 shows a lot flow using a conventional method provided as reference data and FIG. 25 shows a result of a lot flow in a case where the above described logic is incorporated into a production control system 100 and the production control system 100 is actually applied. In FIG. 24, the abscissas represents times and dates from Nov. 1, 1998 to Nov. 30, 1998 while the ordinate represents the number of in-process lots in an ion implantation system. As shown in FIG. 24, it can be seen that the number of lots is largely fluctuated in a broad range from 2 to 30. In FIG. 25, the abscissas represents times and dates from Jun. 1, 1999 to Jun. 30, 1999 while the ordinate represents the number of in-process lots in an ion implantation system. As shown in FIG. 25, the numbers of lots shows minor fluctuations in a narrow range from 2 to 15 and it can be seen that there arises greatly reduced fluctuations as compared to those of FIG. 24. That is, it is clearly shown that fluctuations of the number of lots are leveled out by the use of the lot flow control method of the embodiment 10. When the fluctuations are leveled out in such a way, accuracy of computation can be raised since the numbers of processing processes per lot per day are almost constant. Furthermore, since there arises no conventional in-process lots on a large scale in a waiting state for processing (in the vicinity of each peak of the curve) shown in FIG. 24, an output can be increased for the same input lot amount. This is resulted in equivalence to a case where a fabrication process is improved to raise yield and increase an output. As shown in FIG. 25, an output can be increased by about 10% as compared to one with the use of a conventional method.

As can be seen from the above description, fluctuations of the numbers of lots can be leveled out by the use of lot flow control computation in the embodiment 10. Since, as a result, the number of processes per lot per day is almost constant, accuracy of delivery computation can be improved and an output can be increased for the same input lot amount.

Embodiment 11

An embodiment 11 is to apply the physical flow control method shown in the embodiment 10 of the present invention to another physical flow control, for example to an on-road traffic control system. FIG. 26 shows similar items between a lot flow system and an on-road traffic control system in the embodiment 11. As a traffic system, ITS (Intelligent Transport System) that enables automatic drive or remotely controlled drive of a vehicle is considered. The embodiment 11 is to incorporate the physical flow control method shown in the embodiment 10 of the present invention into ITS.

Figure 27:
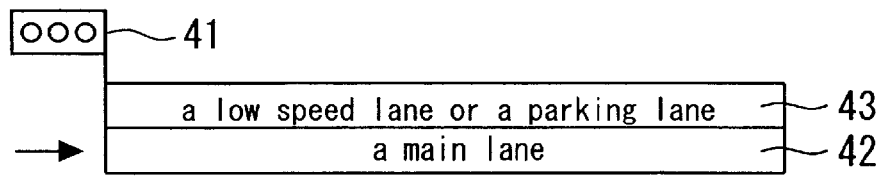
FIG. 27 shows a road with one traffic lane in the embodiment 11 of the present invention.

The one lot processing can be positioned in a corresponding manner to driving a car on a road with one traffic lane. FIG. 27 shows a road with one traffic lane in the embodiment 11 of the present invention. In FIG. 27, a symbol 41 denotes a three-color signal (red, blue and orange) and located on the entrance side relative to the ongoing direction shown by an arrow symbol of FIG. 27. A signal 41 is different from a signal used currently for an ordinary road but denotes a traffic level on the road. For example, there is no need to stop a traffic flow on a road with a signal in red only because of congestion by vehicles on the road. Blue denotes a normal level of traffic and orange denotes less of traffic. A symbol 42 denotes a main lane of two lanes and the main lane is used for ordinary passage. A symbol 43 denotes a low speed lane or a parking lane of the two lanes and not used for ordinary passage. While in a case of lot processing, there are two kinds of lots: one for in-process lots (not-processed) and the other for under-processing, in a case of a vehicle traffic, there is only one kind of vehicles in driving. Further, passage through a road corresponds to processing-completed lots.

Figure 28:
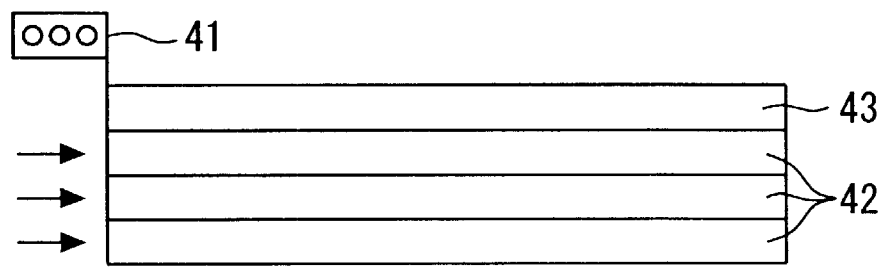
FIG. 28 shows a road with two or more lanes in the embodiment 11 of the present invention.

Simultaneous processing of a plurality of lots can correspond to traffic on two or more lanes. FIG. 28 shows a road with two or more lanes in the embodiment 11 of the present invention. In FIG. 28, constituents denoted by the same symbols as those in FIG. 27 are the same as the constituents corresponding in FIG. 27 and therefore descriptions thereof are omitted. As shown in FIG. 28, there are a plurality of main lanes 42 (three lanes in FIG. 28), but there is only one low speed or parking lane 43. Parallel driving of vehicles on a plurality of respective roads corresponds to parallel processing.

Figure 29:
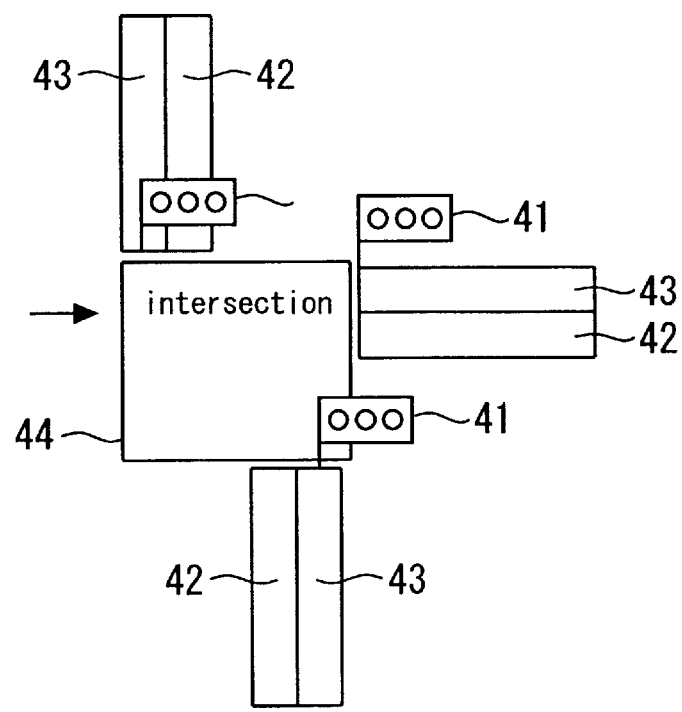
FIG. 29 shows an example of an intersection in the embodiment 11.

Substitution processing can correspond to driving on one of a plurality of roads originating from an intersection or on one of branched roads. FIG. 29 shows an example of an intersection in the embodiment 11. In FIG. 29, constituents denoted by the same symbols are the same as the constituents corresponding in FIG. 27 and therefore, descriptions thereof are omitted. In FIG. 29, a symbol 44 denotes an intersection. Only roads in an ongoing direction on which cars can be driven are shown in the figure. While roads on which cars are already in driving are omitted, ongoing directions thereof are shown with arrow symbols.

While there is no description of a road map corresponding to complex processing as shown in the embodiment 4, handling can be finely adjusted with the use of adjustment parameters based on FIG. 27.

An average number $C_g$ of processing processes per day for all the lots, which is a target, can correspond to a statutory speed. A proper number R of in-process lots can correspond to a proper number of vehicles on the road. The proper number of vehicles on the road can be defined as in a Equation 16 described below:

$$\text{Proper number of vehicles on the road} = \text{Road length}/(\text{Body length} + \text{Braking distance}) \quad \text{(Equation 16)}$$

where a road length is a length of a road along its ongoing direction, a body length is an average body length of vehicles on the road: for example, an average value from surveys on body lengths of vehicles driving on the road, conducted several times per year, and a braking distance is that at a statutory speed since the braking distance varies according to a running speed of a vehicle. A process flow can correspond to a course from starting point to destination. A way to determine a signal color can be the same as in the embodiment 5. There is no correction of a signal color caused by an input amount. A computation method for a signal score can be that using the Equation 15.

A processing order can correspond to a passage order. Factors to determine the passage order include a priority number (priority order) and a signal score. The priority order of vehicles is determined with either of two kinds of emergency use such as a fire engine and general use. The passage order can be obtained by sorting based on signal scores after sorting with the priority order. Passing another or other vehicles becomes necessary in order to correct a current passage order to the passage order obtained from computation.

Figure 30:
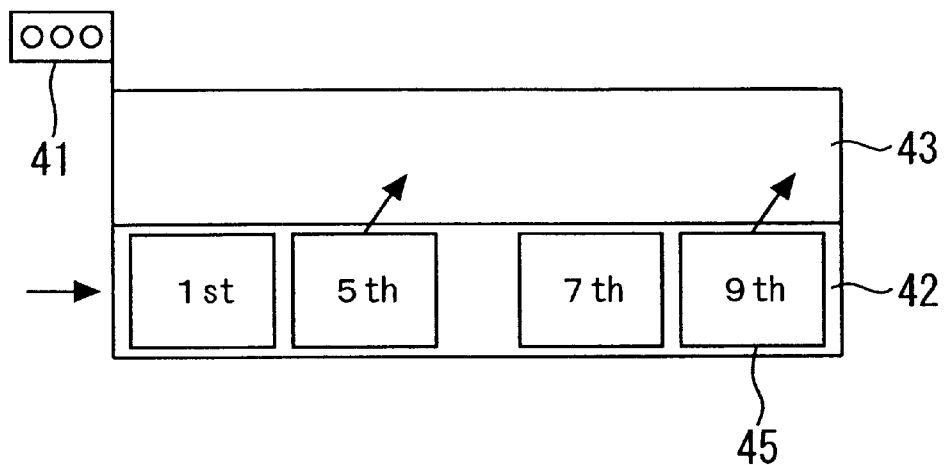
FIG. 30 shows a way of conducting a plurality of simultaneous passings in the embodiment 11.

FIG. 30 shows a way of conducting a plurality of simultaneous passings in the embodiment 11. In FIG. 30, constituents denoted by the same symbols in FIG. 27 are the same as the constituents corresponding in FIG. 27 and therefore descriptions thereof are omitted. In FIG. 30, a symbol 45 denotes vehicles. A number of each vehicle represents a place in the passage order and a vehicle with a smaller number is desirably driven ahead of a vehicle with a larger number. In a case shown in FIG. 30, vehicles with digits 1 and 7 are necessary to pass other vehicles, respectively. The passings are carried out in the following way: First, vehicles 45 with passage order 5 and 9 enter the low speed lane 43 reducing respective driving speeds. Since, by doing so, there arises a free space on the main lane 42, the vehicles with the numbers 1 and 7 of the order of passage occupy the free space to pass the vehicles with the passage order number 5 and 9.

Figure 31A:
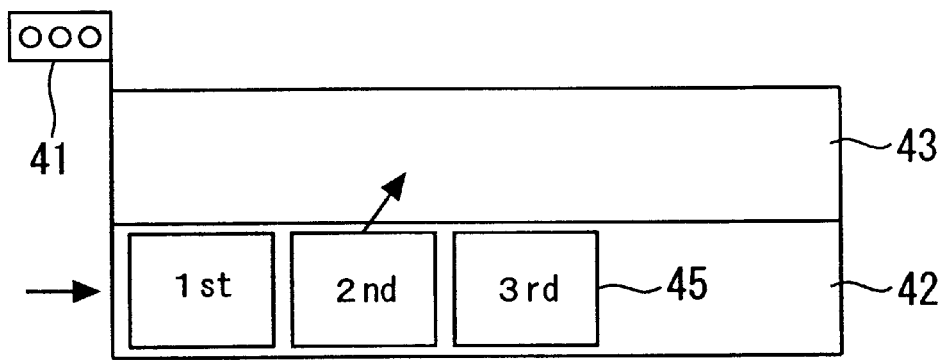
FIGS. 31A and 31B describes a way of passing in a case where vehicles with passage order numbers 1, 2 and 3 are driven in an adjacent manner to one another.
Figure 31B:
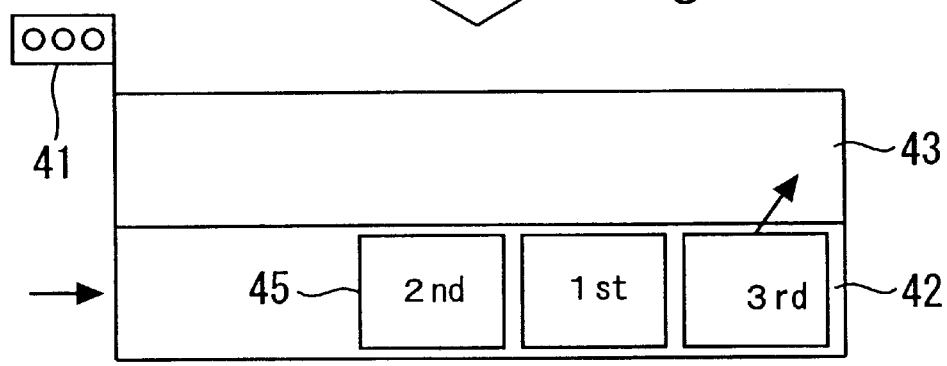

FIGS. 31A and 31B describes a way of passing in a case where vehicles with passage order numbers 1, 2 and 3 are driven in an adjacent manner to one another. In FIGS. 31A and 31B, constituents denoted by the same symbols in FIG. 30 are the same constituents corresponding in FIG. 30 and therefore, descriptions thereof are omitted. As shown in FIG. 31A, the vehicles with passage order numbers 1 and 2 cannot simultaneously conduct passings and therefore, first, the vehicle with a passage order number 2 enters the low speed lane 43 to have vehicle with a passage order number 1 to pass. Then, as shown in FIG. 31B, the vehicle with a passage order number 3 enters the low speed lane to have the vehicle 45 with a passage order number 1 to pass. Finally, the vehicle with a passage order number 3 enters the low speed lane to have the vehicle 45 with a passage order number 2 to pass. In such a way, all the passings can be achieved step by step.

As understood from the above description, according to the embodiment 11, the physical flow control method shown in the embodiment 10 can be applied another physical flow, for example a physical flow of vehicle traffic.

As has been described above, according to a method and apparatus for processing order control of the present invention, a load of an examination work to review the processing order of lots 50 based on processing capacities of apparatuses 40 or the like, and the number of in-process lots 50 or the like therein, such as work loads shown by conventional instructions, can be reduced by obtaining a proper number R of in-process lots. Furthermore, a processing order control method and an apparatus by which accuracy of scheduling such as in delivery can be improved by placing all the lot flows in a state where all the lots move at an almost constant speed and degradation in lot flows can be in turn prevented in advance.

Here, in the processing order control method, said step of the number of waiting processing objects computing may further comprise a step of obtaining a proper number of waiting simultaneous processing objects that receive simultaneously processing in the processing apparatus, by multiplying the proper number of waiting processing objects by the number of simultaneously processible objects in the processing apparatus and by a predetermined adjustment parameter.

In the processing order control method, said processing apparatus may comprise: a buffer retaining not-processed processing objects: and a display device displaying a kind of a processing waiting state according to the number of not-processed processing objets retained in the buffer, wherein said step of the control step comprises the steps of a display of displaying a kind of a processing waiting state of the processing objects in said processing apparatus on said display device based on a result of comparing the number of not-processed processing objects retained in the buffer with a predetermined level of the proper number of waiting processing objects as a reference; and an unloading of unloading each of processing objects according to a kind of a processing waiting state of the processing objects displayed on a display device that is equipped on a processing apparatus in the next process of said processing apparatus.

Here, in the processing order control method said step of the number of waiting processing objects computing further comprises a step of obtaining a proper number of waiting processing objects that receive processings in a plurality of processing apparatuses by adding a result, obtained from multiplying the proper number of waiting processing objects by the number of other processing apparatuses substitutable for the processing apparatus and by a predetermined adjustment parameter, to the proper number of waiting processing objects.

In the processing order control method, said processing apparatus may comprise: a buffer retaining not-processed processing objects: and a display device displaying a kind of a processing waiting state according to the number of not-processed processing objets retained in the buffer, wherein said step of the control step comprises the steps of a display of displaying a kind of a processing waiting state of the processing objects in said processing apparatus on said display device based on a result of comparing the number of not-processed processing objects retained in the buffer with a predetermined level of the proper number of waiting processing objects as a reference; and an unloading of unloading each of processing objects according to a kind of a processing waiting state of the processing objects displayed on a display device that is equipped on a processing apparatus in the next process of said processing apparatus.

In the processing order control method, said processing apparatus may have a plurality of processing regions, connected continuously to one another, and which processes a processing object, and said step of the number of waiting processing objects computing further comprises: a step of obtaining a proper number of waiting processing objects that receive processing in the processing apparatus having the plurality of processing regions by multiplying the proper number of waiting processing objects by a predetermined adjustment parameter.

In the processing order control method, said processing apparatus may comprise: a buffer retaining not-processed processing objects: and a display device displaying a kind of a processing waiting state according to the number of not-processed processing objets retained in the buffer, wherein said step of the control step comprises the steps of a display of displaying a kind of a processing waiting state of the processing objects in said processing apparatus on said display device based on a result of comparing the number of not-processed processing objects retained in the buffer with a predetermined level of the proper number of waiting processing objects as a reference; and an unloading of unloading each of processing objects according to a kind of a processing waiting state of the processing objects displayed on a display device that is equipped on a processing apparatus in the next process of said processing apparatus.

In the processing order control method, said processing apparatus may be one to process waiting parallel-processing objects in separate regions in a parallel manner and said step of the number of waiting processing objects computing further comprises a step of obtaining a proper number of waiting processing objects that receive processing in the processing apparatus in a parallel manner by multiplying the proper number of waiting processing objects by a predetermined adjustment parameter.

In the processing order control method, said processing apparatus may comprise a buffer retaining not-processed processing objects: and a display device displaying a kind of a processing waiting state according to the number of not-processed processing objets retained in the buffer, wherein said step of the control step comprises the steps of a display of displaying a kind of a processing waiting state of the processing objects in said processing apparatus on said display device based on a result of comparing the number of not-processed processing objects retained in the buffer with a predetermined level of the proper number of waiting processing objects as a reference; and an unloading of unloading each of processing objects according to a kind of a processing waiting state of the processing objects displayed on a display device that is equipped on a processing apparatus in the next process of said processing apparatus.

In the processing order control method, said processing apparatus may comprise: a buffer retaining not-processed processing objects: and a display device displaying a kind of a processing waiting state according to the number of not-processed processing objets retained in the buffer, wherein said step of the control step comprises the steps of a display of displaying a kind of a processing waiting state of the processing objects in said processing apparatus on said display device based on a result of comparing the number of not-processed processing objects retained in the buffer with a predetermined level of the proper number of waiting processing objects as a reference; and an unloading of unloading each of processing objects according to a kind of a processing waiting state of the processing objects displayed on a display device that is equipped on a processing apparatus in the next process of said processing apparatus.

In the processing order control method, said step of display may present a kind of a processing object processible in said processing apparatus on said display device based on a result of comparing the number of actually input processing objects with a value obtained by multiplying the proper number of input processing objects by a predetermined adjustment parameter, wherein the proper number of input processing objects, input in a processing waiting state, is obtained by multiplying the sum of 1 and the proper number of waiting processing objects by the number of processes available in a predetermined time.

In the processing order control method, said step of the unloading may comprise the steps of a display score computing of obtaining a display score obtained by summing kinds of processing waiting states in the numerical form of processing objects which are assigned with predetermined weights before the summing, the processing waiting states being displayed on display devices that later processes by a predetermined number of siad processing apparatus have; and an unloading controlling of controlling unloading of the processing objects according to the display score.

Here, the processing order control method, after said step of the display score computing, further comprising: a classifying step of classifying the processing objects based on a process in which the processing objects are placed into a processing waiting state, recipes showing separate processing control targets for individual processing objects, the number of constituents constituting each of the processing objects, a display score obtained by said step of the display score computing, a predetermined priority order in which processing objects are processed, and dates and times at which the processing objects are placed into a processing waiting state in this order.

In the processing order control method, said processing objects may be lots constituted of a plurality of semiconductor wafers, the processing waiting state is an in-process state and processings that the processing objects receive are ones in a semiconductor fabrication line.

In the processing order control method, said processing objects may be vehicles, the processing waiting state may be a passage awaiting state, and the processings that the processing objects receive may be passages on a road by vehicles.

In the processing order control apparatus, said processing apparatus may further comprise: a buffer retaining not-processed processing objects: and a display device presenting a kind of a processing waiting state according to the number of not-processed processing objets retained in the buffer, wherein said control means comprises: a display means for displaying a kind of a processing waiting state of the processing objects in said processing apparatus on said display device based on a result of comparing the number of not-processed processing objects retained in the buffer with a predetermined level of the proper number of waiting processing objects as a reference; and an unloading means for unloading each of processing objects according to a kind of a processing waiting state of the processing objects displayed on a display device that is equipped on a second processing apparatus in the next process of the first processing apparatus.

In the processing order control apparatus, said unloading means may comprise: a display score computing means for obtaining a display score obtained by summing kinds of processing waiting states in the numerical form of processing objects which are assigned with predetermined weights before the summing, the processing waiting states being displayed on display devices that later processes by a predetermined number of said processing apparatus have; and an unloading controlling means for controlling unloading of the processing objects according to the display score.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 2000-42082 filed on Feb. 18, 2000 including specification, claims, drawings and summary are incorporated herein by reference in its entirety.

What is claimed is:

1. A processing order control method for controlling an order in processing that processing objects receive from a processing apparatus, respectively, comprising the steps of:

a processing waiting time computing of obtaining a processing waiting time per process by dividing a total processing waiting time during which a processing object is placed in a processing waiting state where the processing object awaits processings given by the processing apparatuses in a predetermined time, by the number of processing processes that the processing object receives in the predetermined time;

an average processing time computing of obtaining an average processing time per process per processing object for a processing apparatus by dividing a total processing time spent for processings that the processing objects receive from the processing apparatus, by the number of processing processes and by the number of processing objects;

a number of waiting processing objects computing of obtaining a proper number of waiting processing objects that receive processings in a processing apparatus by dividing the processing waiting time per process obtained by said step of the processing waiting time computing, by the average processing time per process per processing object for the processing apparatus obtained by said step of the average processing time computing; and a control of conducting control to equalize an actual number of processing waiting objects that receive processings in a processing apparatus with a proper number of waiting processing objects obtained by said step of the number of waiting processing objects computing which processing objects receive processings in the processing apparatus.

2. The processing order control method according to claim 1, wherein said step of the number of waiting processing objects computing further comprises a step of obtaining a proper number of waiting simultaneous processing objects that receive simultaneously processing in the processing apparatus, by multiplying the proper number of waiting processing objects by the number of simultaneously processible objects in the processing apparatus and by a predetermined adjustment parameter.

3. The processing order control method according to claim 2, wherein said processing apparatus comprises: a buffer retaining not-processed processing objects: and a display device displaying a kind of a processing waiting state according to the number of not-processed processing objets retained in the buffer, wherein said step of the control step comprises the steps of:
  a display of displaying a kind of a processing waiting state of the processing objects in said processing apparatus on said display device based on a result of comparing the number of not-processed processing objects retained in the buffer with a predetermined level of the proper number of waiting processing objects as a reference; and
  an unloading of unloading each of processing objects according to a kind of a processing waiting state of the processing objects displayed on a display device that is equipped on a processing apparatus in the next process of said processing apparatus.

4. The processing order control method according to claim 1, wherein said step of the number of waiting processing objects computing further comprises a step of obtaining a proper number of waiting processing objects that receive processings in a plurality of processing apparatuses by adding a result, obtained from multiplying the proper number of waiting processing objects by the number of other processing apparatuses substitutable for the processing apparatus and by a predetermined adjustment parameter, to the proper number of waiting processing objects.

5. The processing order control method according to claim 4, wherein said processing apparatus comprises: a buffer retaining not-processed processing objects: and a display device displaying a kind of a processing wafting state according to the number of not-processed processing objets retained in the buffer,
  wherein said step of the control step comprises the steps of:
    a display of displaying a kind of a processing waiting state of the processing objects in said processing apparatus on said display device based on a result of comparing the number of not-processed processing objects retained in the buffer with a predetermined level of the proper number of waiting processing objects as a reference; and
    an unloading of unloading each of processing objects according to a kind of a processing waiting state of the processing objects displayed on a display device that is equipped on a processing apparatus in the next process of said processing apparatus.

6. The processing order control method according to claim 1, wherein said processing apparatus has a plurality of processing regions, connected continuously to one another, and which processes a processing object, and said step of the number of waiting processing objects computing further comprises: a step of obtaining a proper number of waiting processing objects that receive processing in the processing apparatus having the plurality of processing regions by multiplying the proper number of waiting processing objects by a predetermined adjustment parameter.

7. The processing order control method according to claim 6, wherein said processing apparatus comprises: a buffer retaining not-processed processing objects: and a display device displaying a kind of a processing waiting state according to the number of not-processed processing objets retained in the buffer,
  wherein said step of the control step comprises the steps of:
    a display of displaying a kind of a processing waiting state of the processing objects in said processing apparatus on said display device based on a result of comparing the number of not-processed processing objects retained in the buffer with a predetermined level of the proper number of waiting processing objects as a reference; and
    an unloading of unloading each of processing objects according to a kind of a processing waiting state of the processing objects displayed on a display device that is equipped on a processing apparatus in the next process of said processing apparatus.

8. The processing order control method according to claim 1, wherein said processing apparatus is one to process waiting parallel-processing objects in separate regions in a parallel manner and said step of the number of waiting processing objects computing further comprises a step of obtaining a proper number of waiting processing objects that receive processing in the processing apparatus in a parallel manner by multiplying the proper number of waiting processing objects by a predetermined adjustment parameter.

9. The processing order control method according to claim 8, wherein said processing apparatus comprises: a buffer retaining not-processed processing objects: and a display device displaying a kind of a processing waiting state according to the number of not-processed processing objets retained in the buffer,
  wherein said step of the control step comprises the steps of:
    a display of displaying a kind of a processing waiting state of the processing objects in said processing apparatus on said display device based on a result of comparing the number of not-processed processing objects retained in the buffer with a predetermined level of the proper number of waiting processing objects as a reference; and
    an unloading of unloading each of processing objects according to a kind of a processing waiting state of the processing objects displayed on a display device that is equipped on a processing apparatus in the next process of said processing apparatus.

10. The processing order control method according to claim 1, wherein said processing apparatus comprises: a buffer retaining not-processed processing objects: and a display device displaying a kind of a processing waiting state according to the number of not-processed processing objets retained in the buffer,
  wherein said step of the control step comprises the steps of:
    a display of displaying a kind of a processing waiting state of the processing objects in said processing apparatus on said display device based on a result of comparing the number of not-processed processing objects retained in the buffer with a predetermined level of the proper number of waiting processing objects as a reference; and
    an unloading of unloading each of processing objects according to a kind of a processing waiting state of the processing objects displayed on a display device that is equipped on a processing apparatus in the next process of said processing apparatus.

11. The processing order control method according to claim 10, wherein said step of display presents a kind of a processing object processible in said processing apparatus on said display device based on a result of comparing the number of actually input processing objects with a value obtained by multiplying the proper number of input processing objects by a predetermined adjustment parameter, wherein the proper number of input processing objects, input in a processing waiting state, is obtained by multiplying the sum of 1 and the proper number of waiting processing objects by the number of processes available in a predetermined time.

12. The processing order control method according to claim 10, wherein said step of the unloading comprises the steps of:
- a display score computing of obtaining a display score obtained by summing kinds of processing waiting states in the numerical form of processing objects which are assigned with predetermined weights before the summing, the processing waiting states being displayed on display devices that later processes by a predetermined number of said processing apparatus have; and
- an unloading controlling of controlling unloading of the processing objects according to the display score.

13. The processing order control method according to claim 12, after said step of the display score computing, further comprising the step of:
- a classifying of classifying the processing objects based on a process in which the processing objects are placed into a processing waiting state, a predetermined priority order in which processing objects are processed, a display score obtained by said step of the display score computing, the number of constituents constituting each of the processing objects, dates and times at which the processing objects are placed into a processing waiting state, and recipes showing separate processing control targets for individual processing objects in this order.

14. The processing order control method according to claim 12, after said step of the display score computing, further comprising:
- a classifying step of classifying the processing objects based on a process in which the processing objects are placed into a processing waiting state, recipes showing separate processing control targets for individual processing objects, the number of constituents constituting each of the processing objects, a display score obtained by said step of the display score computing, a predetermined priority order in which processing objects are processed, and dates and times at which the processing objects are placed into a processing waiting state in this order.

15. The processing order control method according to claim 1, wherein said processing objects are lots constituted of a plurality of semiconductor wafers, the processing waiting state is an in-process state and processings that the processing objects receive are ones in a semiconductor fabrication line.

16. The processing order control method according to claim 1, wherein said processing objects are vehicles, the processing waiting state is a passage awaiting state, and the processings that the processing objects receive are passages on a road by vehicles.

17. A processing order control apparatus having processing objects and a processing apparatus that process the processing objects, comprising:
- a processing waiting time computing means for obtaining a processing waiting time per process by dividing a total processing waiting time during which a processing object is placed in a processing waiting state where the processing object awaits processings given by the processing apparatuses in a predetermined time, by the number of processing processes that the processing object receives in the predetermined time;
- an average processing time computing means for obtaining an average processing time per process per processing object for a processing apparatus by dividing a total processing time spent for processings that the processing objects receive from the processing apparatus, by the number of processing processes and by the number of processing objects;
- a number of waiting processing objects computing means for obtaining a proper number of waiting processing objects that receive processings in a processing apparatus by dividing the processing waiting time per process obtained by said processing waiting time computing means, by the average processing time per process per processing object for the processing apparatus obtained by said average processing time computing means; and
- a control means for conducting control to equalize an actual number of processing waiting objects that receive processings in a processing apparatus with a proper number of waiting processing objects obtained by said number of waiting processing objects computing means which processing objects receive processings in the processing apparatus.

18. The processing order control apparatus according to claim 17 wherein said processing apparatus further comprises: a buffer retaining not-processed processing objects: and a display device presenting a kind of a processing waiting state according to the number of not-processed processing objets retained in the buffer,
wherein said control means comprises:
- a display means for displaying a kind of a processing waiting state of the processing objects in said processing apparatus on said display device based on a result of comparing the number of not-processed processing objects retained in the buffer with a predetermined level of the proper number of waiting processing objects as a reference; and
- an unloading means for unloading each of processing objects according to a kind of a processing waiting state of the processing objects displayed on a display device that is equipped on a second processing apparatus in the next process of the first processing apparatus.

19. The processing order control apparatus according to claim 18 wherein said unloading means comprises:
- a display score computing means for obtaining a display score obtained by summing kinds of processing waiting states in the numerical form of processing objects which are assigned with predetermined weights before the summing, the processing waiting states being displayed on display devices that later processes by a predetermined number of said processing apparatus have; and
- an unloading controlling means for controlling unloading of the processing objects according to the display score.

* * * * *